(12) United States Patent
Lloyd

(10) Patent No.: US 8,922,485 B1
(45) Date of Patent: Dec. 30, 2014

(54) BEHAVIORAL RECOGNITION ON MOBILE DEVICES

(75) Inventor: Matthew Lloyd, Cambridge, MA (US)

(73) Assignee: Google Inc., Mountain View, CA (US)

( * ) Notice: Subject to any disclaimer, the term of this patent is extended or adjusted under 35 U.S.C. 154(b) by 796 days.

(21) Appl. No.: 12/972,206

(22) Filed: Dec. 17, 2010

Related U.S. Application Data

(60) Provisional application No. 61/287,969, filed on Dec. 18, 2009.

(51) Int. Cl.
*G06F 3/033* (2013.01)

(52) U.S. Cl.
USPC .......................................... 345/158; 345/156

(58) Field of Classification Search
CPC ..... G06F 3/0304; G06F 3/0346; G06F 3/038; G06F 3/041; G06F 3/048; G06F 3/0487; G06F 3/0488
See application file for complete search history.

(56) References Cited

U.S. PATENT DOCUMENTS

| | | | |
|---|---|---|---|
| 6,813,491 B1 | 11/2004 | McKinney | |
| 2003/0103091 A1 | 6/2003 | Wong et al. | |
| 2004/0131259 A1* | 7/2004 | Nefian | 382/228 |
| 2005/0216867 A1* | 9/2005 | Marvit et al. | 715/863 |
| 2006/0052109 A1 | 3/2006 | Ashman, Jr. et al. | |
| 2008/0284739 A1* | 11/2008 | Andrews et al. | 345/173 |
| 2009/0132197 A1 | 5/2009 | Rubin et al. | |
| 2009/0182560 A1* | 7/2009 | White | 704/235 |
| 2010/0121636 A1 | 5/2010 | Burke et al. | |

FOREIGN PATENT DOCUMENTS

| | | |
|---|---|---|
| EP | 1 063 837 | 12/2000 |
| JP | 2007-280219 | 10/2007 |
| WO | WO 2007/149731 | 12/2007 |

OTHER PUBLICATIONS

Ris et al. "Assessing Local Noise Level Estimation Methods: Application to Noise Robust ASR" *Speech Communication*, 34 (2001) 141-158.

Weiss et al. "DySANA: Dynamic Speech and Noise Adaptation for Voice Activity Detection" *ICASSP* 2008, 1-4.

Hirsch et al. "Noise estimation techniques for robust speech recognition" *Proc. IEEE Internat. Conf. Audio*, 12(1), 1995, 153-156.

Dupont et al. "Assessing Local Noise Level Estimation Methods" *Workshop on Robust Methods For Speech Recognition in Adverse Conditions* (Nokia, COST249, IEEE), pp. 115-118, Tampere, Finland, May 1999.

English language Abstract for Japanese Publication No. JP 2007-280219.

* cited by examiner

*Primary Examiner* — Kenneth Bukowski
(74) *Attorney, Agent, or Firm* — Leydig, Voit & Mayer, Ltd.

(57) ABSTRACT

The disclosure generally relates to identifying gestures on mobile devices for use in connection with speech detection. A gesture may be identified using at least one Bayesian network, such as a Hidden Markov Model. Each Bayesian network corresponds to one of a plurality of different gesture types, which may include different gestures or similar gestures performed at different speeds, for example. Each Bayesian network includes states corresponding to partitioned segments in an accelerometer time series for the associated gesture type. Segmenting the accelerometer time series allows the Bayesian network to account for the speed at which the user makes the gesture, minimizing any effect of the user's speed in performing the gesture on identifying the gesture type. An action may be taken based on the identified gesture type. For example, speech recording may start or stop and/or a notification regarding speech recording may be provided depending on the gesture identified.

28 Claims, 26 Drawing Sheets

BEHAVIORAL RECOGNITION ON MOBILE DEVICES

RELATED APPLICATION

This application claims priority under 35 U.S.C. §119 to U.S. Provisional Patent Application No. 61/287,969, entitled "Systems and Methods for Behavioral Recognition on Mobile Devices," filed on Dec. 18, 2009, the entire disclosure of which is hereby incorporated herein by reference.

TECHNICAL FIELD

The present disclosure relates to gesture recognition in connection with speech detection on mobile devices.

BACKGROUND

As computer processors have decreased in size and expense, mobile computing devices have become increasingly widespread. Designed to be portable, many mobile computing devices are lightweight and small, enough to be worn or carried in a pocket or handbag. However, the portability of modern mobile computing devices comes at a price: today's mobile computing devices often incorporate small input devices to reduce the size and weight of the device. For example, many current mobile devices include small keyboards that many people (especially those with poor dexterity) find difficult to use.

Some mobile computing devices address this problem by allowing a user to interact with the device using speech. For example, a user can place a call to someone in his contact list by simply speaking a voice command (e.g., "call") and the name of the person into the phone. However, speech can be difficult to distinguish from background noise in some environments, and it can be hard to capture user speech in a manner that is natural to the user. In addition, it can be challenging to begin recording speech at the right time. For example, if recording begins after the user has started speaking, the resulting recording may not include all of the user's voice command. Furthermore, a user may be notified that a spoken command was not recognized by the device after the user has spoken, which can be frustrating for users.

Therefore, it is desirable to provide an alternative mechanism for detecting speech on a mobile device.

SUMMARY

In certain exemplary embodiments, a method for identifying a gesture performed via a mobile computing device can include observing the gesture and using at least one Bayesian network, such as a Hidden Markov Model, to identify a type of the gesture. Each Bayesian network can correspond to one of multiple different gesture types, which may include different gestures or similar gestures performed at different speeds, for example. Each Bayesian network includes states corresponding to partitioned segments in an accelerometer time series for the associated gesture type. Segmenting the accelerometer timeseries can allow the Bayesian network to account for the speed at which the user makes the gesture, minimizing any effect of the user's speed in performing the gesture on identifying the gesture type. An action may be taken based on the identified gesture type. For example, speech recording may start or stop and/or a notification regarding speech recording may be provided depending on the gesture identified.

These and other aspects, objects, features, and advantages of the exemplary embodiments will become apparent to those having ordinary skill in the art upon consideration of the following detailed description of illustrated exemplary embodiments, which include the best mode of carrying out the invention as presently perceived.

DETAILED DESCRIPTION OF EXEMPLARY EMBODIMENTS

Overview

Figure 1:
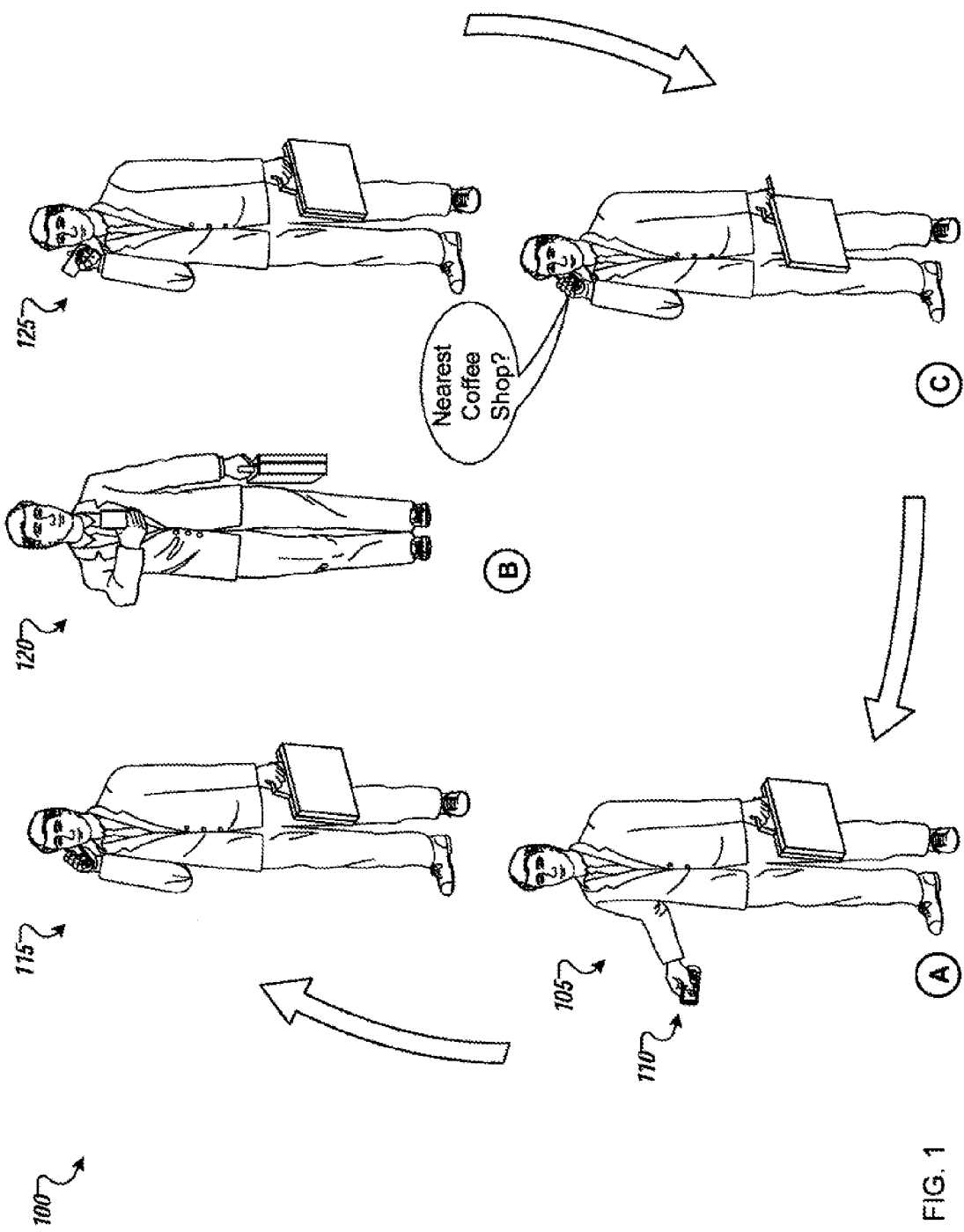
FIG. 1 is a conceptual diagram of an example of multisensory speech detection.

This document describes systems and methods for detecting behavioral gestures on a mobile device. In some implementations, a mobile device can detect a behavioral gesture by a user based on features observed during the gesture, such as a distance from the mobile device to the user, an acceleration of the mobile device, a position of the mobile device relative to the user, etc. For example, these features may be applied to at least one Bayesian network, such as a Hidden Markov Model, to identify the gesture and take an appropriate action in response to the gesture.

Each Bayesian network can correspond to one of multiple different gesture types, which may include different gestures or similar gestures performed at different speeds, for example: Each Bayesian network includes states corresponding to partitioned segments in an accelerometer time series for the associated gesture type. Segmenting the accelerometer timeseries can allow the Bayesian network to account for the speed at which the user makes the gesture, minimizing any effect of the user's speed in performing the gesture on identifying the gesture type.

For example, when a mobile device user seeking to make a telephone call moves the mobile device from a resting position to a "phone pose," as described below, the movement may include several parts. The user may first move the mobile device from a resting position with some acceleration until it reaches a maximum speed. Then, the user may move the mobile device at a constant speed (zero acceleration other than due to gravity). Then, the user may begin slowing down the movement of the mobile device as it approaches the user's ear (negative acceleration). Finally, the user will hold the mobile device in a stationary position near the user's ear.

Rather than using the accelerometer to measure the entire gesture at once and aim to recognize the entire gesture, the mobile device can use the accelerometer to measure these four separate movements in series. By measuring and recognizing the accelerometer data in sections of the accelerometer timeseries, the mobile device can have a more accurate representation of the movements of the user, and can more accurately determine when the device is in a particular pose. In addition, as set forth below, segmenting the accelerometer timeseries can allow the Bayesian network to account for the speed at which the user makes the gesture, minimizing any effect of the user's speed in performing the gesture on identifying the gesture type. An action may be taken based on the identified gesture type. For example, speech recording may start or stop and/or a notification regarding speech recording may be provided depending on the gesture identified.

One or more aspects of the invention may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing the invention in computer programming, and the invention should not be construed as limited to any one set of computer program instructions. Further, a skilled programmer would be able to write such a Computer program to implement an embodiment of the disclosed invention based on the appended flow charts and associated description in the application text. Therefore, disclosure of a particular set of program code instructions is not considered necessary for an adequate understanding of how to make and use the invention. The inventive functionality of the invention will be explained in more detail in the following description, read in conjunction with the figures illustrating the program flow.

Turning now to the drawings, in which like numerals indicate like elements throughout the figures, exemplary embodiments of the invention are described in detail.

System Architecture

FIG. 1 is a conceptual diagram 100 of multisensory speech detection. The diagram 100 depicts a user 105 holding a mobile device 110. The mobile device 110 may be a cellular telephone, PDA, laptop, or another portable computing device. In the illustrative example shown in FIG. 1, the user 105 may want to interact with a software application running on the mobile device 110. For example, the user may want to search for the address of a business using a Web-based application such as GOOGLE MAPS. Typically, the user 105 would use the mobile device 110 to type the name of the business into a search box on an appropriate website to conduct the search. However, the user 105 may be unwilling or unable to use the device 110 to type the necessary information into the website's search box.

In the illustrative example of multisensory speech detection shown in FIG. 1, the user 105 may conduct the search by simply placing the mobile device 110 in a natural operating position and saying the search terms. For example, in some implementations, the device 110 may begin or end recording speech by identifying the orientation of the device 110. The recorded speech (or text corresponding to the recorded speech) may be provided as input to a selected search application.

The letters "A," "B," and "C" in FIG. 1 represent different states in the illustrative example of multisensory speech detection. In State A, the user 105 is holding the device 110 in a non-operating position; that is, a position outside a predetermined set of angles or too far from the user 105 or, in some cases, both. For example, between uses, the user 105 may hold the device 110 at his side as shown in FIG. 1 or place the device in a pocket or bag. If the device 110 has such an orientation, the device 110 is probably not in use, and it is unlikely that the user 105 is speaking into the mobile device 110. As such, the device 110 may be placed in a non-recording mode.

When the user 105 wants to use the device 110, the user 105 may place the device 110 in an operating mode/position. In the illustrative example shown in the diagram 100, the device 110 may determine when it is placed in selected operating positions, referred to as poses. State B shows the mobile device 110 in several example poses. For example, the leftmost figure in State B illustrates a "telephone pose" 115. A telephone pose can, in some implementations, correspond to the user 105 holding the mobile device 110 in a position commonly used to speak into a telephone. For example, as shown in FIG. 1, the device 110 may be held to a side of the user's 105 head with the speaker of the device 110 held near the user's 105 ear. Holding the device 110 in this way can make it easier for the user 105 to hear audio emitted by the device 110 and speak into a microphone connected to the device 110.

The middle figure shown in State B depicts the user 105 holding the device 110 in a "PDA pose" 120. For example, as shown in FIG. 1, PDA pose 120 may correspond to the user 105 holding the mobile device 110 at nearly arm's length and positioned so that the user 105 can see and interact with the mobile device 110. For instance, in this position, the user 105 can press buttons on the keypad of the device 110 or a virtual keyboard displayed on the device's 110 screen. In some cases, the user 105 may also enter voice commands into the device 110 in this position.

Finally, the right-most figure shown in State B illustrates a "walkie-talkie pose" 125. In some cases, a walkie-talkie pose 125 may comprise the user 105 holding the mobile device 110 to his face such that the device's 110 microphone is close the user's 105 mouth. This position may allow the user 105 to speak directly into the microphone of the device 110, while also being able to hear sounds emitted by a speakerphone linked to the device 110.

Although FIG. 1 shows three poses, others may be used. For instance, in an alternative implementation, a pose may take into account whether a mobile device is open or closed. For example, the mobile device 110 shown in FIG. 1 may be a "flip phone"; that is, a phone having a form factor that includes two or more sections (typically a lid and a base) that can fold together or apart using a hinge. For some of these devices, a pose may include whether the phone is open or closed, in addition to (or in lieu of) the orientation of the phone. For instance, if the mobile device 110 is a flip phone, the telephone pose 115 shown in FIG. 1 may include the device being open. Even though the current example describes a flip phone, other types or form factors (e.g., a phone that swivels or slides open) may be used.

When the device 110 is identified as being in a predetermined pose, the device 110 may begin recording auditory information such as speech from the user 115. For example, State C depicts a user speaking into the device 110 while the device 110 is in the telephone pose. Because, in some implementations, the device 110 may begin recording auditory information when the device 110 is detected in the telephone pose 115, the device 110 may begin recording just before (or as) the user 105 starts speaking. As such, the device 110 may capture the beginning of the user's speech.

When the device 110 leaves a pose, the device 110 may stop recording. For instance, in the example shown in FIG. 1, after the user 105 finishes speaking into the device 110, he may return the device 110 to a non-operating position by, for example, placing the device 110 by his side as shown at State A. When the device 110 leaves a pose (telephone pose 115 in the current example), the device 110 may stop recording. For example, if the device 110 is outside a selected set of angles and/or too far from the user 105, the device 110 can cease its recording operations. In some cases, the information recorded by the device 110 up to this point can be provided to an application running on the device or on a remote device. For example, as noted above, the auditory information can be converted to text and supplied to a search application being executed by the device 110.

Figure 2:
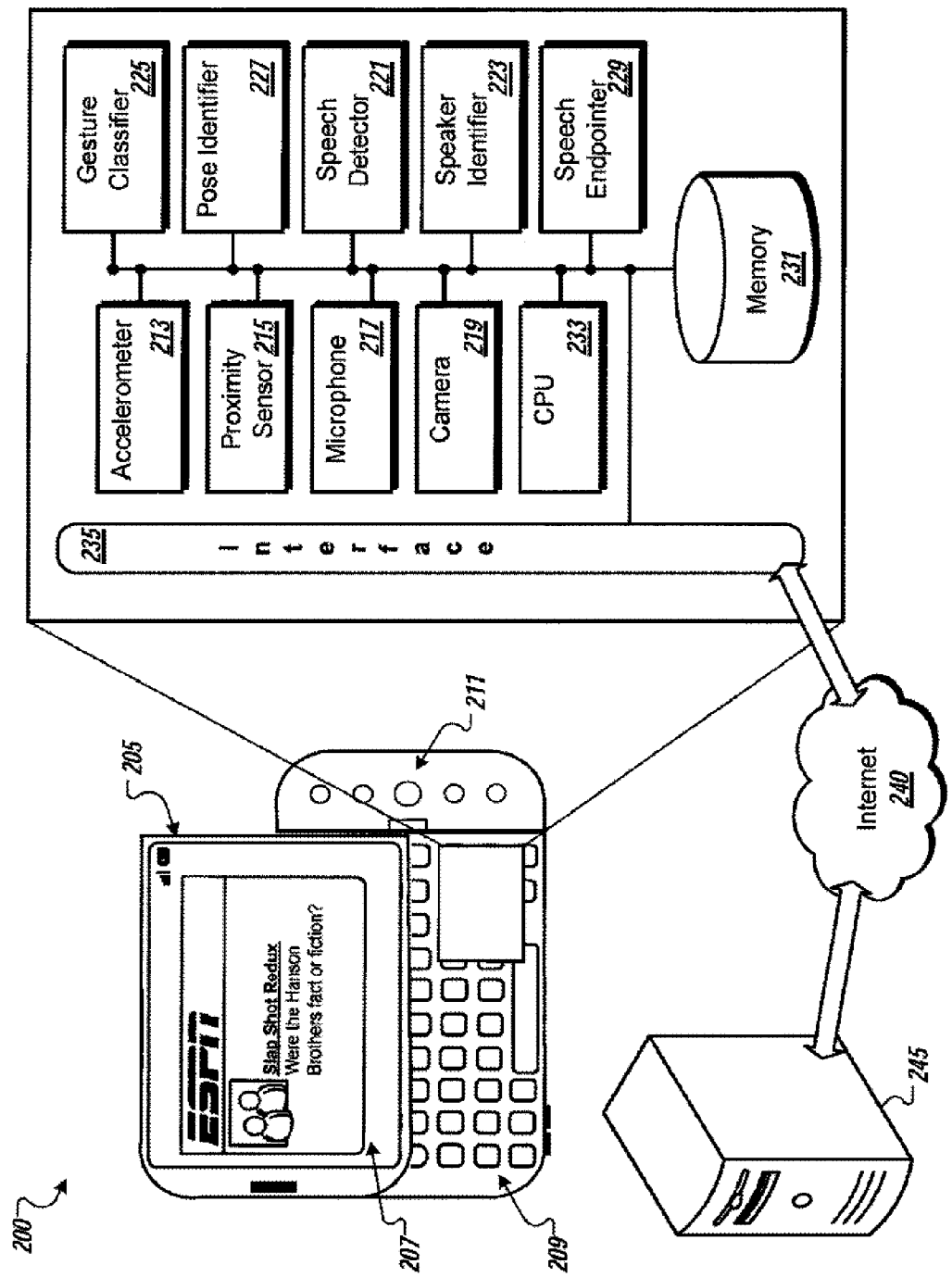
FIG. 2 is a block diagram of an example multisensory speech detection system.

FIG. 2 is a block diagram of an example multisensory speech detection system 200. The system 200 includes a mobile device 205, which includes a screen 207 that, in some cases, can be used to both display output to a user and accept user input. For example, the screen 207 may include a touch screen that can display a keypad that can be used to enter alphanumeric characters. In addition or in the alternative, the device 205 may include a physical keypad 209 that may be used to input information into the device 205. In some cases, the device 205 may include a button (not shown) on the keypad 209 or another part of the phone (e.g., on a side of the phone) that starts and stops a speech application running on the device 205. The device 205 also can incorporate a trackball 211 or other input device (not shown), such as a touch pad, that, in some cases, may be used to, among other things, manipulate a pointing element displayed on a graphical user interface on the device 205.

The device 205 may include one or more sensors that can be used to detect speech readiness, among other things. For example, the device 205 can include an accelerometer 213. The accelerometer 213 may be used to determine an angle of the device 205. For example, the accelerometer 213 can determine an angle of the device 205 and supply this information to other device 205 components.

In addition to the accelerometer 213, the device 205 may also include a proximity sensor 215. In some cases, the proximity sensor 215 can be used to determine how far the device 205 is from a user. For example, the proximity sensor 215 may include an infrared sensor that emits a beam of infrared light and uses the reflected signal to compute the distance to an object. In alternative implementations, other types of sensors may be used. For example, the sensor may be capacitive, photoelectric, or inductive, among other kinds of sensors.

The device can also include a camera 219. Signals from the camera 219 can be processed to derive additional information about the pose of the device 205. For example, if the camera 219 points toward the user, the camera 219 can determine the proximity of the user. In some cases, the camera 219 can determine the angle of the user using features having a known angle, such as the horizon, vehicles, pedestrians, etc. For example, if the camera 219 is pointing at a general scene that does not include a user, the camera 219 can determine its orientation in the scene in an absolute coordinate system. However, if the camera 219 can see the user, the camera 219 can determine its orientation with respect to the user. If the camera 219 can see both the general scene and the user, the camera 219 can determine both its orientation with respect to the user and the scene and, in addition, can determine where the user is in the scene.

The device 205 may also include a central processing unit 233 that executes instructions stored in memory 231. The processor 233 may comprise multiple processors responsible for coordinating interactions among other device components and communications over an input-output (I/O) interface 235. The device 205 may communicate with one or more remote computing devices 245 through the Internet 240. In certain exemplary embodiments, some or all of the processing performed in connection with the device 205, including processing described below in connection with the gesture classifier 225, pose identifier 227, speech detector 221, speaker identifier 223, and speech endpointer 229, can be performed by the remote computing device 245.

A microphone 217 may capture auditory input and provide the input to both a speech detector 221 and a speaker identifier 223. In some implementations, the speech detector 221 may determine if a user is speaking into the device 205. For example, the speech detector 221 can determine whether the auditory input captured by the microphone 217 is above a threshold value. If the input is above the threshold value, the speech detector 221 may pass a value to another device 205 component, indicating that the speech has been detected. In some cases, the device 205 may store this value in memory 231 (e.g, RAM or a hard drive) for future use.

In some cases, a speech detector 221 can determine when a user is speaking. For example, the speech detector 221 can determine whether captured audio signals include speech or consist entirely of background noise. In some cases, the speech detector 221 may assume that the initially detected audio is noise. Audio signals at a specified magnitude (e.g., 6 dB) above the initially detected audio signal may be considered speech.

If the device includes a camera 219, the camera 219 may also provide visual signals to the speech detector 221 that can be used to determine if the user is speaking. For example, if the user's lips are visible to the camera, the motion of the lips may be an indication of speech activity, as may be correlation of that motion with the acoustic signal. A lack of motion in the user's lips can, in some cases, be evidence that the detected acoustic energy came from another speaker or sound source.

The speaker identifier 223, in some cases, may be able to determine the identity of the person speaking into the device 205. For example, the device 205 may store auditory profiles (e.g., speech signals) of one or more users. The auditory information supplied by the microphone 217 may be compared to the profiles; a match may indicate that an associated user is speaking into the device 205. Data indicative of the match may be provided to other device 205 components, stored in memory, or both. In some implementations, identification of a speaker can be used to confirm that the speech is not background noise, but is intended to be recorded.

The speaker identifier 223 can also use biometric information obtained by the camera 219 to identify the speaker. For example, biometric information captured by the camera can include (but is not limited to) face appearance, lip motion, ear shape, or hand print. The camera 219 may supply this information to the speaker identifier 223. The speaker identifier 223 can use any or all of the information provided by the camera 219 in combination with (or without) acoustic information to deduce the speaker's identity.

The device 205 may also include a gesture classifier 225. The gesture classifier 225 may be used to classify movement of the device 205. In some cases, the accelerometer 213 can supply movement information to the gesture classifier 225 that the gesture classifier 225 may separate into different classifications. For example, the gesture classifier 225 can classify movement of the phone into groups such as "shake" and "flip." In addition, the gesture classifier 225 may also classify motion related to gestures such as "to mouth," "from mouth," "facing user," "to ear," and "from ear."

A pose identifier 227 included in the device 205 may infer/detect different poses of the device 205. The pose identifier 227 may use data provided by the proximity sensor 215 and the gesture classifier 225 to identify poses. For example, the pose identifier 227 may determine how far the device 205 is from an object (e.g., a person) using information provided by the proximity sensor 215. This information, combined with a gesture classification provided by the gesture classifier 225 can be used by the pose identifier 227 to determine which pose (if any) the device 205 has been placed in. In one example, if the gesture classifier 225 transmits a "to ear" classification to the pose identifier 227 and the proximity sensor 215 indicates that the device is being held close to the user, the pose identifier 227 may determine that the device 205 is in telephone pose. A camera 219 can also be used to provide evidence about movement. For example, the optical flow detected by the camera 219 may provide evidence of movement.

The device may also include a speech endpointer 229. The speech endpointer 229, in some implementations, can combine outputs from the pose identifier 227, speaker identifier 223, and speech detector 221, to determine; inter alia, whether a user is speaking into the device 205, beginning to speak into the device 205, or has stopped speaking into the device 205. For example, the pose identifier 227 may transmit information to the endpointer 229 indicating that the device 205 is not in an operating position. Inputs from the speech detector 221 and speaker identifier 223 may indicate that the user is not currently speaking. The combination of these inputs may indicate to, the endpointer 229 that the user has stopped speaking.

Figure 3:
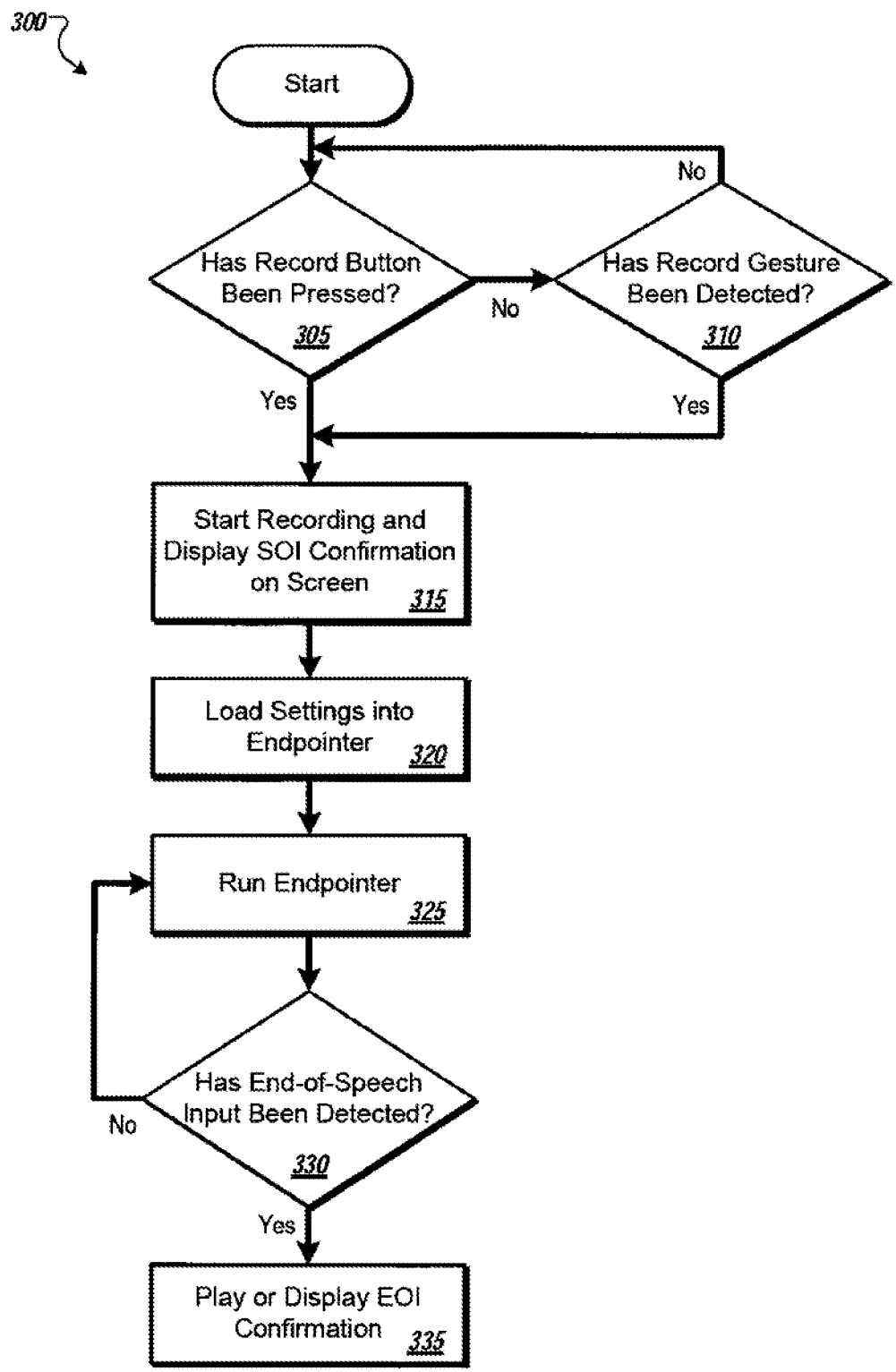
FIG. 3 illustrates an example process of multisensory speech detection.
Figure 4:
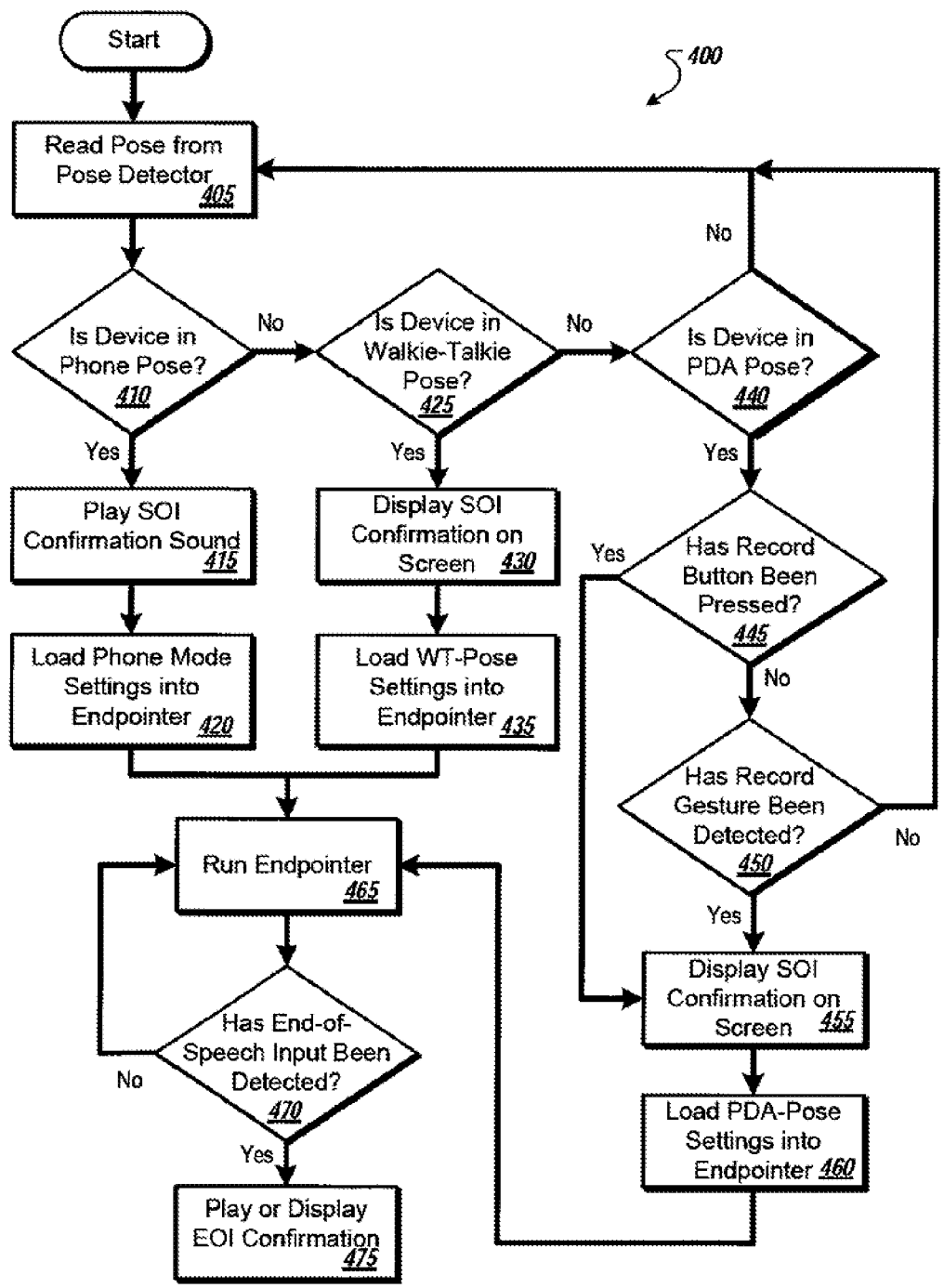
FIG. 4 illustrates an example alternative process of multisensory speech detection.

FIGS. 3 and 4 are flow charts of example processes 300 and 400, respectively, for multisensory speech detection. The processes 300 and 400 may be performed, for example, by a system such as the system 200 shown in FIG. 2 and, for clarity of presentation, the description that follows uses that system as the basis of an example for describing the processes. However, another system, or combination of systems, may be used to perform the processes 300 and 400.

FIG. 3 illustrates an example process 300 of multisensory speech detection. The process 300 begins at block 305, where it is determined whether a record button has been pressed. For example, as noted above, the mobile devices 205 may include a button that allows a user to initiate or end speech recording by pressing the button. If a button press is detected at block 305, the process 300 may start recording speech and display a start of input (S01) confirmation that recording has started at block 315. For example, the device 205 may execute a recording program stored in memory when the button is pressed. In addition, the device 205 may display a message on the screen of the device 205, indicating that recording has begun. In some implementations, the device 205 may vibrate or play a tone, in addition to, or in lieu of, display an on-screen confirmation.

However, if a record button press is not detected at block 305, the process 300 can proceed to block 310 where it is determined whether a record gesture has been detected. For example, a user may be holding the device 205 in the PDA pose. When the user brings the device 205 to his mouth, the gesture classifier 225 may classify this motion as a "to-mouth" gesture and cause the device 205 to execute a recording application. In some implementations, other gestures such as shaking or flipping the phone can be considered a record gesture. If it is determined in block 310 that the user has made a record gesture, the process 300 may proceed to block 315, where a recording process is started and a recording confirmation is displayed as described above. If it is determined in block 310 that the user has not made a record gesture, the process 300 may return to block 305 to repeat monitoring for a record initiation action by the user (i.e., determining whether the user has depressed a record button or made a record gesture).

The process 300 loads settings into an endpointer, such as endpointer 229, at block 320. In some cases, the device 205 may load pose-specific speech detection parameters, such as a speech energy threshold that can be used to detect speech. For example, in some cases, the speech energy threshold for a pose may be compared to detected auditory information. If the auditory information is greater than the speech energy threshold, this may indicate that a user is speaking to the device 205. In some implementations, poses may have an associated speech energy threshold that is based on the distance between the device 205 and a user when the device 205 is in the specified pose. For instance, the device 205 may be closer to a user in telephone pose than it is in PDA pose. Accordingly, the speech energy threshold may be lower for the PDA pose than it is for the telephone pose because the user's mouth is farther from the device 205 in PDA pose.

At block 325, the endpointer runs. For example, device 205 may execute endpointer 229 in block 325. In response, the endpointer 229 can use parameters loaded at block 320 to determine whether the user is speaking to the device 205, and related events, such as the start and end of speech. For example, the endpointer 229 may use a speech energy threshold, along with inputs from the pose identifier 227, speech detector 221, and/or speaker identifier 223 to determine whether the user is speaking and, if so, whether the speech is beginning or ending.

At block 330, an end-of-speech input may be detected. As discussed above, the endpointer 229 may determine whether speech has ended using inputs from other device components and/or a speech energy threshold. If the end of speech input has been detected, recording may cease and an end of input (EOI) display indicating that recording has ended may be provided at block 335. For example, a message may appear on the screen of the device 205 or a sound may be played. In some cases, tactile feedback (e.g., a vibration) may be provided.

FIG. 4 illustrates an example alternative process 400 of multisensory speech detection. The process 400 begins at block 405 where a pose is read from a pose detector, such as the pose identifier 227. Alternatively, an indication of the current pose may be read from memory, such as memory 231.

At block 410, it is determined whether the device 205 is in phone pose. For example, the pose identifier 227 can use inputs from the proximity sensor 215 and the gesture classifier 225 to determine if the device is in phone pose. In some cases, the pose of the device can be identified by determining how far the device is from the user and whether the device is within a set of predetermined angles. If the device 205 is in phone pose, a sound confirming that recording has begun may be played at block 415. In some implementations, another type of feedback (e.g., a vibration or a display of a message) may be provided with, or instead of, the audio confirmation.

At block 420, phone pose settings may be loaded into an endpointer, such as endpointer 229. For example, a speech energy threshold associated with the phone pose may be read from memory 231 into the endpointer 229.

Similarly, at block 425 it is determined whether the device is in walkie-talkie pose. As noted above, the pose identifier 227 can use inputs from the gesture classifier 225 and/or the proximity sensor 215 to determine the pose of the device 205. If the device 205 is in the walkie-talkie pose, confirmation that recording has begun may be displayed on the screen (in some cases, confirmation may alternatively or additionally be tactile and/or auditory) at block 430 and walk-talkie pose settings may be loaded into an endpointer, such as the endpointer 229, at block 435.

At block 440, it is determined whether the device is in the PDA pose. In some cases, the pose of the device 205 can be determined as described in regards to steps 410 and 425 above. If the device 205 is not in the PDA pose, the method 400 can return to block 405 to continue monitoring the pose of the device 205. If the device 205 is in the PDA pose in block 440, it can be determined whether a record button has been pressed at block 445. If a record button has not been pressed, the method 400 proceeds to block 450, where it is determined if a record gesture has been detected. For example, as discussed in relation to block 310 of FIG. 3 above, the device 205 may detect a movement of the device 205 toward a user's mouth. In some cases, the device 205 may interpret this motion as a record gesture.

If a record button was pressed at block 445 or a record gesture was detected at block 450, a message confirming that recording has begun can be displayed on the screen of the device 205 at block 455. In addition or in the alternative, the device 205 may vibrate or play a sound to indicate that recording has started. Settings associated with the PDA pose may be loaded into an endpointer, such us the endpointer 229, at block 460. For example, a speech energy threshold may be loaded into the endpointer 229.

For each of the poses described above, after the appropriate pose settings are read into an endpointer, the endpointer may be run at block 465. For example, a processor 233 associated with the device 205 may execute instructions stored in memory that correspond to the endpointer 229. Once the endpointer 229 has begun executing, the endpointer 229 may determine whether an end-of-speech input has been detected at block 470. For example, the endpointer 229 may determine whether an end-of-speech input has been detected using outputs from the pose identifier 227, speech detector 221, and/or speaker identifier 223, and/or parameters associated with the pose that have been loaded into the endpointer 229. For example, the endpointer 229 may determine when the device 205 is no longer in one of the specified poses using outputs from the previously mentioned sources. At block 475, the process 400 may play or display a confirmation that speech recording has ceased. For example, an end-of-recording message may be displayed on the device's 205 screen and/or a sound may be played. In addition or in the alternative, the device 205 may vibrate to indicate the cessation of recording.

Figure 5A:
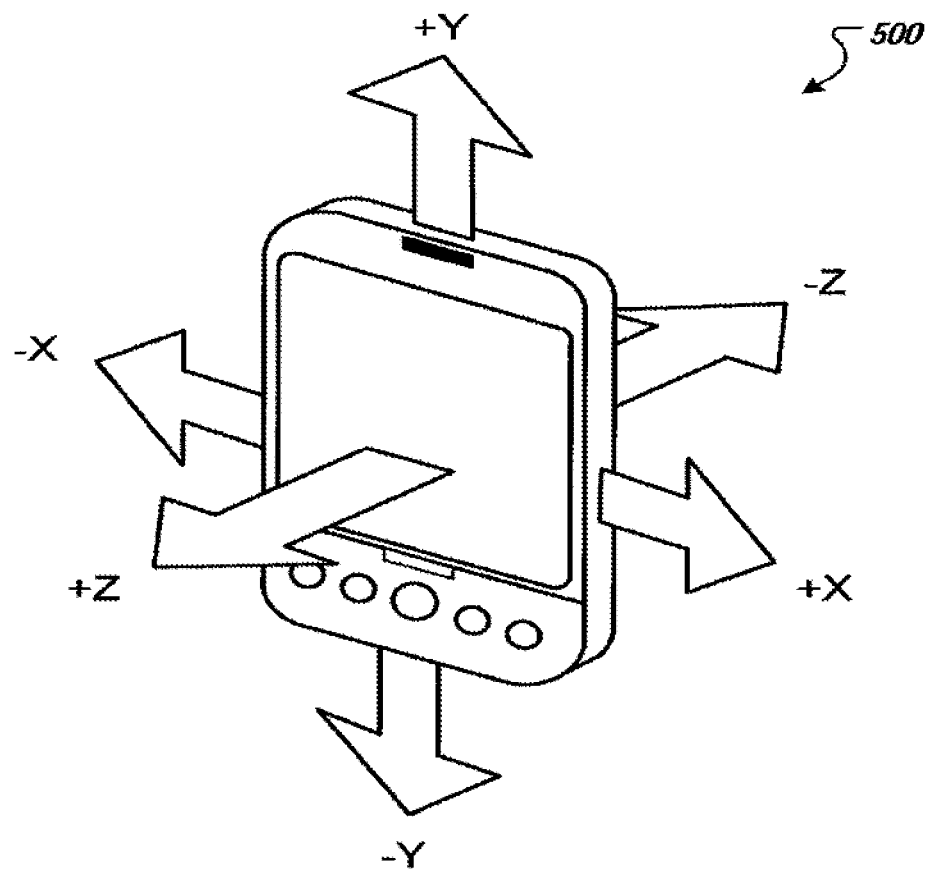
FIGS. 5A and 5B illustrate coordinate systems for gesture recognition.
Figure 5B:
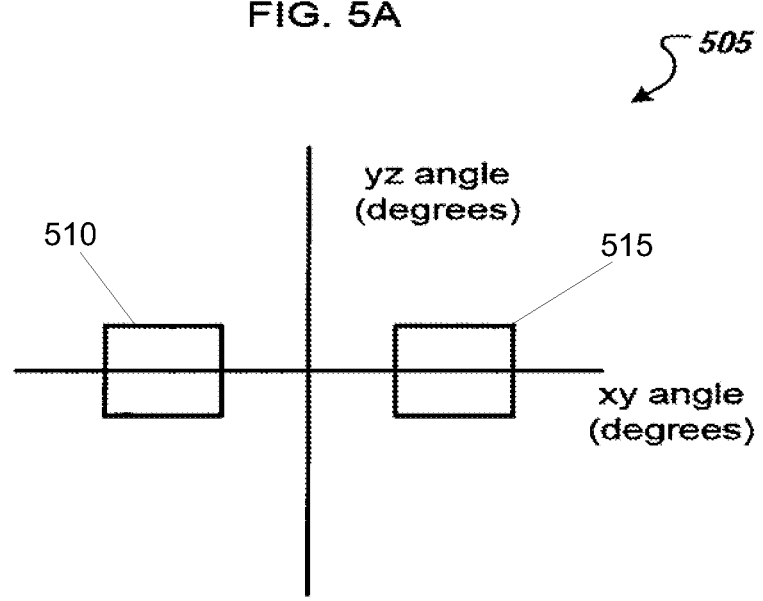

FIGS. 5A and 5B show example coordinate systems 500 and 505 for gesture recognition. FIG. 5A shows an illustrative Cartesian coordinate system 500 for a mobile device, such as the device 205. The illustrative coordinate system 500 is a three-dimensional coordinate system with X-, Y-, and Z-axes. In some cases, an accelerometer (such as the accelerometer 213 shown in FIG. 2) can be used to determine an angle of the mobile device in the coordinate system 500. The determined angle can, in turn, be used to determine a pose of the device 205.

For example, acceleration data provided by the accelerometer 213 may be smoothed by, for instance, using a digital filter (e.g., an infinite impulse response filter). In some cases, the accelerometer 213 may have a sample frequency of 10 Hz. In addition, the infinite impulse response filter may have a filtering factor of 0.6. The magnitude of the instantaneous acceleration may be calculated from the residual of the filter. A resulting gravity vector may be projected onto XY and YZ planes of the coordinate system and the angle subtended by the projected components may be calculated using the inverse tangent of the components. The resulting two angles can be projected onto a new plane such as the one shown in FIG. 5B and critical angle bounding boxes 510 and 515 can be defined around the left and right hand positions of the phone to a user's ear. As described in further detail below, these bounding boxes can be used to detect gestures, among other things.

Figure 6:
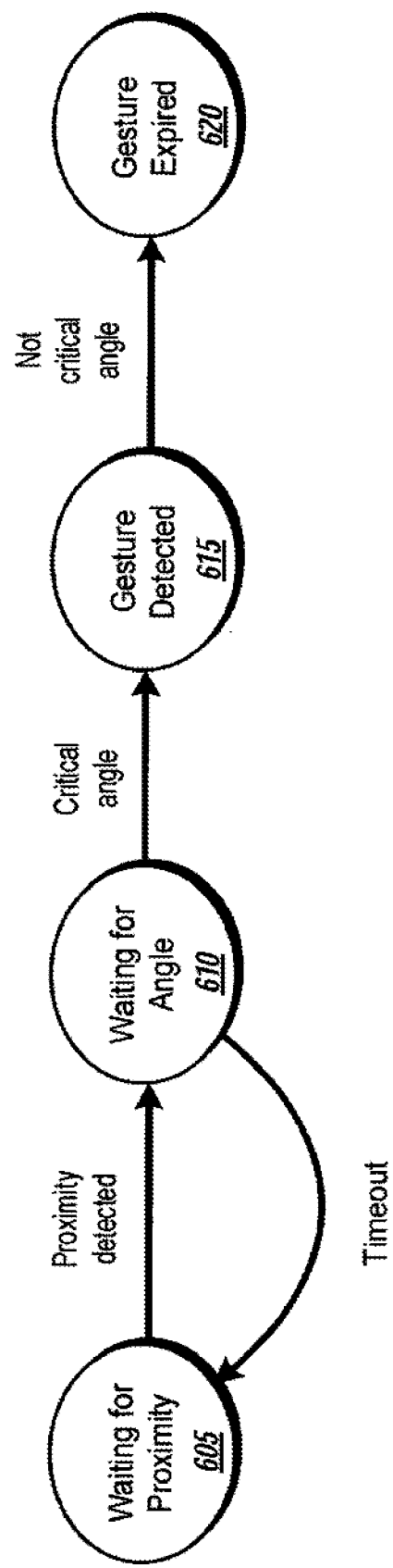
FIG. 6 is an example state machine for gesture recognition.

FIG. 6 is an example state machine 600 for gesture recognition. The state machine 600 can use the critical angle bounding boxes described above, along with proximity information, to classify gestures. The illustrative state machine can be clocked by several events: a specified proximity being detected, the device 205 being within a critical set of angles, or a time expiring. For example, the illustrative state machine can wait for a predetermined proximity to be detected at state 605. In some cases, the state machine 600 may activate the proximity sensor 215 when either the instantaneous acceleration of the device 205 is greater than a threshold or the device 205 is placed at a set of critical angles. In some cases, the critical angles may be angles that fall within the bounding boxes shown in FIG. 5B. For example, the left-most bounding box 510 may include angles between −80 and −20 degrees in the XY plane and −40 and 30 degrees in the YZ plane. Similarly, bounding box 515 may include angles between 20 and 80 degrees in the XY plane and −40 and 30 degrees in the YZ plane. A person of ordinary skill in the art will recognize that bounding boxes of different sizes and shapes may be used in certain alternative exemplary embodiments.

If the proximity sensor detects an object within a preset distance of the device 205, the state machine 600 transitions to state 610 where it waits for an angle. In some cases, if the proximity sensor 215 detects a user within the predetermined distance and the device 205 was previously determined to be at the critical angles (e.g., the state machine was activated because the device 205 was placed at the critical angles) the state machine 600 transitions to the next state 615. If the device 205 was not previously placed at the critical angles, the device 205 may wait for a preset period for the device 205 to be placed at the critical angles; this preset period may allow any acceleration noise to settle. In some cases, the preset period may be one second.

If the device 205 is not placed at the critical angles within the predetermined period, the state machine 600 may transition back to state 605. However, if the device 205 is detected at the critical angles within the predetermined threshold, the state machine transitions to state 615 where a gesture is detected. In some cases, the gesture classifier 225 may classify the detected gesture. For example, the gesture may fall into the following categories: "to mouth," "from mouth," "facing user," "to ear," and "from ear." In some implementations, other categories may be defined. If the device 205 is determined to no longer be at the critical angles, the state machine 600 may transition to state 620, where the gesture has expired. In some implementations, a minimum debounce period may prevent this transition from happening because of angle bounce. For example, the minimum debounce period may be 1.7 seconds.

Figure 7:
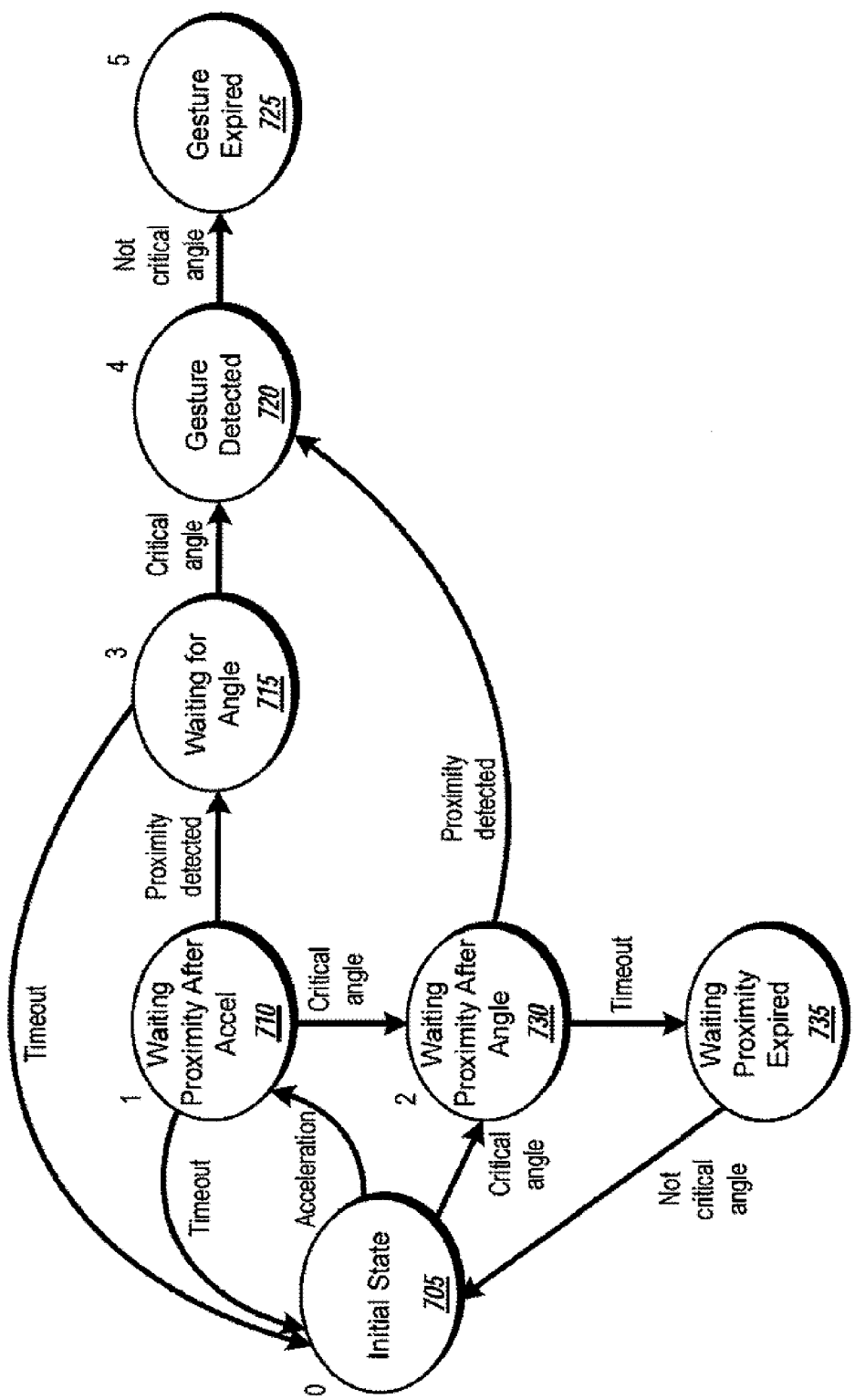
FIG. 7 illustrates another implementation of a state machine for gesture recognition.

FIG. 7 illustrates another implementation of a state machine 700 for gesture recognition. FIG. 7 shows the illustrative state machine 700 responding to variations in gestures, where the gestures vary according to the detected acceleration (e.g., slow, medium, and fast gestures). The illustrative state machine 700 may be useful, for example, in implementations where the device 205 includes a proximity sensor 215 that does not detect a proximate condition if the proximity sensor 215 is activated when the device 205 is already proximate a surface or where activation of the proximity detector may trigger other actions such as switching off the screen. In some cases, to address this issue, the proximity sensor 215 may be activated when an instantaneous acceleration or rate of change of the acceleration surpasses a threshold. In some cases, the proximity sensor 215 may be activated when the sensor 215 crosses the instantaneous acceleration across all axes.

The state machine 700 begins in an initial state 705. If an acceleration above a threshold is detected, the machine 700 transitions to state 710 where it waits for proximity detection after the detected acceleration. In some implementations, the acceleration threshold may be 0.6 g. In some cases, the wait may be 0.5 seconds. If the device 205 is proximate an object, such as a user, the state machine 700 transitions to state 715 where it waits a predetermined time for the device to be placed at the critical angles. In some cases, the wait may be one second.

If the device 205 is not placed at the critical angles within the specified time, the state machine returns to its initial state 705. However, if the device 205 is placed at the critical angles, the state machine 700 transitions to state 720 where a gesture is detected, such as in the manner described above. When the device 205 is no longer within the critical angles, the state machine 700 transitions to state 725 where the gesture has expired. These transitions may correspond to a fast gesture.

In some cases, after acceleration has been detected, the device 205 may be placed in critical angles and, as such, the state machine 700 can proceed to state 730, where it waits for a proximity detection. If no proximity detection is made within a preset time, the state machine 700 can transition to state 735 where the waiting proximity time has expired and subsequently return to its initial state 705. In some cases, the preset time may be one second. However, if a proximity detection is made before the preset time expires, the state machine 700 can transition to states 720 and 725 as described above. In some cases, this series of transitions may correspond to a medium-speed gesture.

If the state machine 700 is in its initial state 705 and the device 205 has been placed at the critical angles, the state machine 700 can transition to state 730 where the state machine 700 waits for proximity detection. If proximity detection occurs before a timeout period, the state machine 700 proceeds to state 720 where a gesture is detected. If the device 205 is moved from the critical angles, the state machine 700 transitions to state 725 where the gesture has expired. This series of transitions may correspond to a gesture made at relatively slow pace.

In certain alternative exemplary embodiments, the critical angles, as well as other movement, orientation, and acceleration features used in gesture recognition may be measured using a spherical polar coordinate system in addition to or in place of a Cartesian coordinate system. As would be recognized by one of ordinary skill in the art, a three-dimensional spherical polar coordinate system includes three coordinates: rho ("r"), theta ("θ"), and phi ("Φ"), representing the distance from the origin, the angle from the x-axis to the y-axis, and the angle from the x-y plane to the z-axis, respectively. Cartesian coordinates can be converted to spherical polar coordinates using the following equations:

$$\text{rho} = \sqrt{(x^2 + y^2 + z^2)} \quad (1)$$

$$\text{theta} = \arctan(y/x) \quad (2)$$

and $$\text{phi} = \arccos(z/\text{rho}). \quad (3)$$

Using a spherical polar coordinate system can provide certain advantages when compared to using a Cartesian coordinate system. For example, the spherical polar coordinate system can provide a representation of the gesture trajectory that has greater invariance to changes in the starting position, and thus may provide superior classification accuracy. This advantage occurs because rotational movement of a gesture along, a the spherical polar coordinate system will affect only the theta and phi components, but not the rho component, which will remain constant. Conversely, all three variables of the Cartesian coordinate system can vary when a gesture is rotated.

Figure 20:
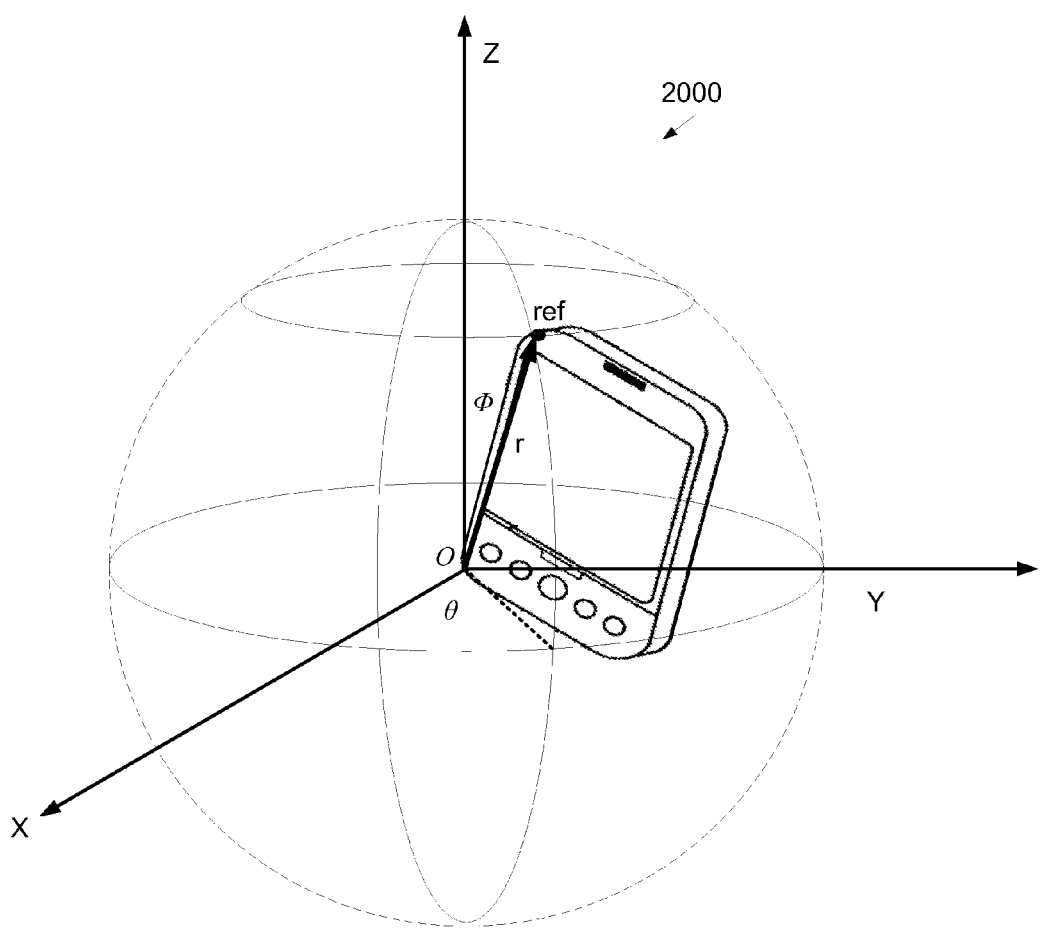
FIG. 20 illustrates a polar coordinate system for gesture recognition, in accordance with certain exemplary embodiments.

FIG. 20 illustrates an exemplary spherical polar coordinate system 2000, which includes a position of reference ("ref") on the device 205, described in the spherical polar coordinate system 2000 with radial (magnitude), azimuth, and zenith angle coordinates r, θ, and phi, respectively. A person of ordinary skill in the art will recognize that these coordinates are based on an origin O and any alternative origin and reference points can be selected in other exemplary embodiments.

The spherical polar coordinate system 2000 can provide a representation of gesture trajectory that has greater invariance to changes in the starting position and may provide superior classification accuracy. In certain exemplary embodiments, the spherical polar coordinate system 2000 may be rotated such that a reference point in the gesture is aligned with a fixed combination of angles. For example, the angle at the beginning or end of the gesture, or the angle at the point in the trajectory that has the greatest value for r, can be used as the reference point. In certain exemplary embodiments, the accelerometer 213 and/or gesture classifier 225 may perform, this same calibration procedure each time a gesture is detected or classified. For example, prior to running a Gaussian Mixture Model or Hidden Markov Model for pose or speech detection, as described below, the accelerometer 213 and/or gesture classifier 225 may rotate applicable timeseries examples so that the reference point has $\Phi$ and $\theta$ values of zero. This calibration provides better robustness against the position and angle of the user performing the gesture. For example, the calibration can allow the same detection of a gesture regardless of whether the user starts in a standing up position or a lying down position.

In certain alternative exemplary embodiments, a dynamic Bayesian model can be used, including additional states for each gesture that represent various different starting angles of the gesture. Additionally, the gravitational acceleration and positional acceleration components also can have additional states that depend on the original parameters and the new starting angle, such that the resulting vector components can be appropriately rotated according to the starting angle.

Figure 8A:
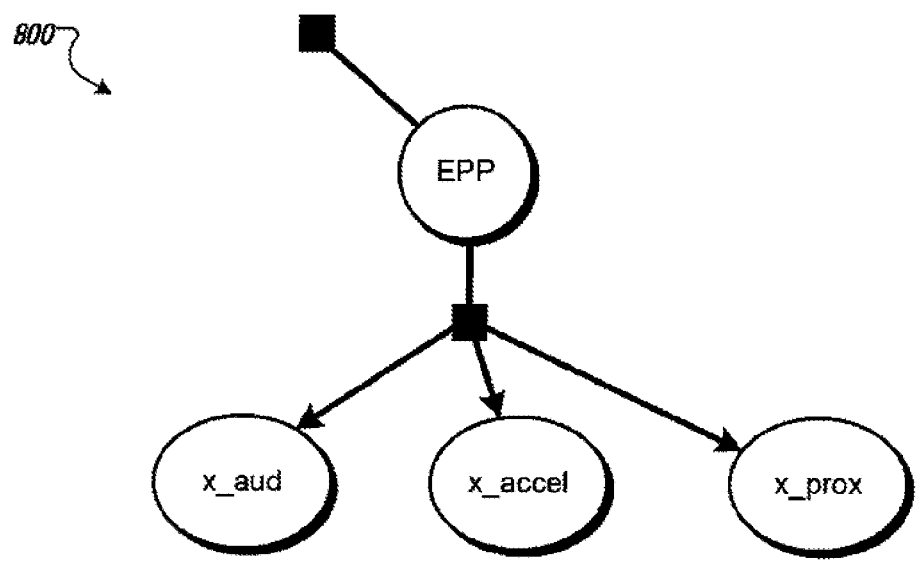
FIGS. 8A and 8B illustrate Bayes nets for pose and speech detection.
Figure 8B:
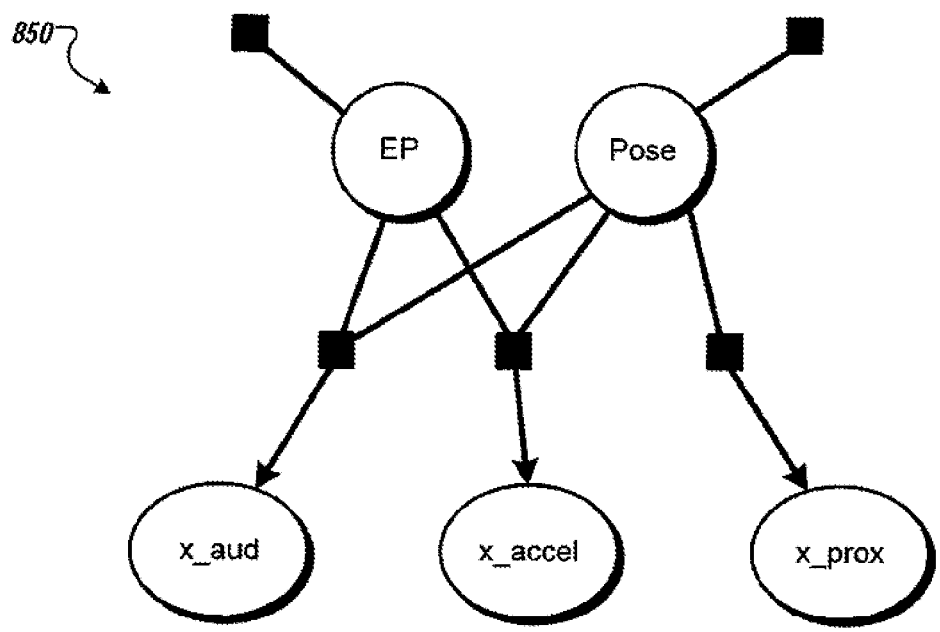

FIGS. 8A and 8B illustrate exemplary Bayesian networks 800 and 850, respectively for pose and speech detection. Outputs from a proximity sensor 215, accelerometer 213, and/or speech detector 221 can be combined into the Bayesian network 800 as shown in FIG. 8A. For example, the Bayesian network 800 shown in FIG. 8A can represent the following distribution:

$$p(x\_aud, x\_accel, x\_prox | EPP)p(EPP) \quad (1)$$

In equation (1), x_aud can represent an audio feature vector, x_accel can represent an acceleration feature vector, and x_prox can represent a proximity feature vector. A hidden state variable, EPP, can represent a cross product of an endpointer speech variable "EP" and a pose state variable "Pose." The EP and Pose variables can be discrete random variables.

FIG. 8B illustrates a factorization 850 of the hidden state variable EPP into the EP vector and the Pose state variable. This factorization can facilitate better use of training data and faster inference. The distribution can be factored as follows:

$$p(x\_aud | EP, Pose)p(x\_accel | EP, Pose)p(x\_prox | Pose) \\ p(EP)p(Pose) \quad (2)$$

In some cases, the distributions p(x_aud|EP, Pose) and p(x_accel|EP, Pose) and p (x_prox|Pose) can be Gaussian Mixture Models.

Figure 9:
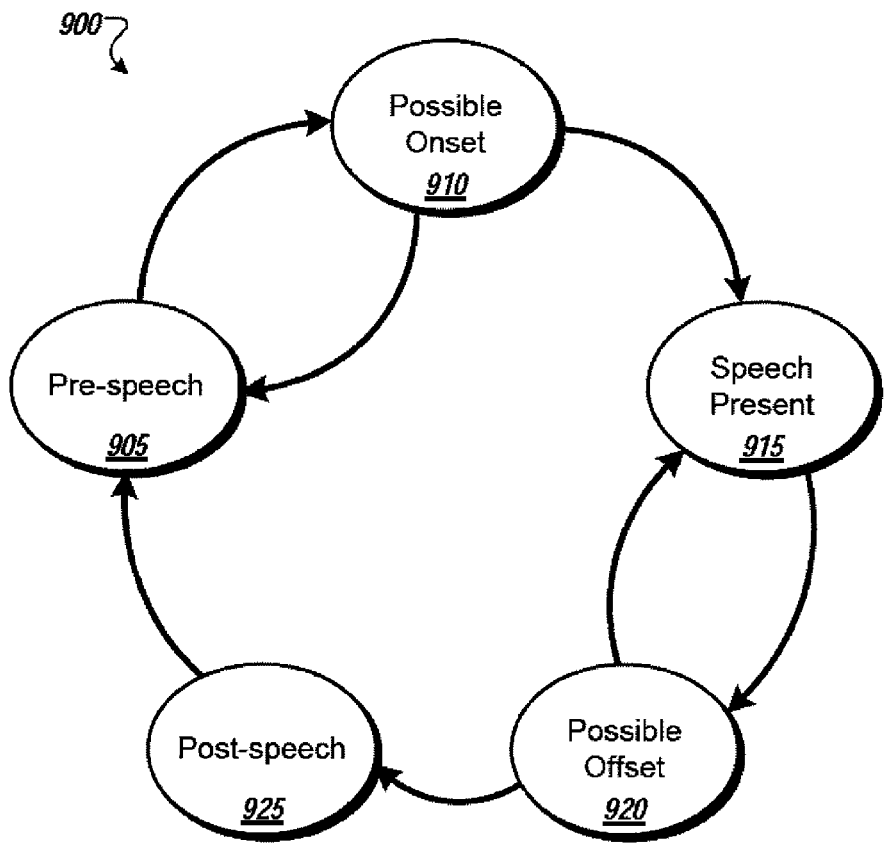
FIG. 9 illustrates an endpointer state machine.

In some implementations, the posterior probability for EP can be used as an input to an endpointer state machine. For example, FIG. 9 illustrates an endpointer state machine 900, according to certain exemplary embodiments. In the illustrative implementation shown in FIG. 9, an EP posterior probability can be thresholded and a time frame may be determined to contain either noise or speech. In this example, noise may be represented by a zero value and speech can be represented by a one value. A circular buffer of thresholded values may be stored. A one value in a buffer can be used to drive the endpointer state machine shown in FIG. 9. For example, if the initial state 905 is pre-speech and the number of one values in the circular buffer exceeds a threshold, the machine moves to state 910 "Possible Onset." If the number of one values fall below the threshold the machine moves back to the "Pre-Speech" state 905. The state machine 900 can transition backward and forward among the "Speech Present" 915, "Possible Offset" 920 and "Post Speech" 925 states in a similar fashion.

Figure 10:
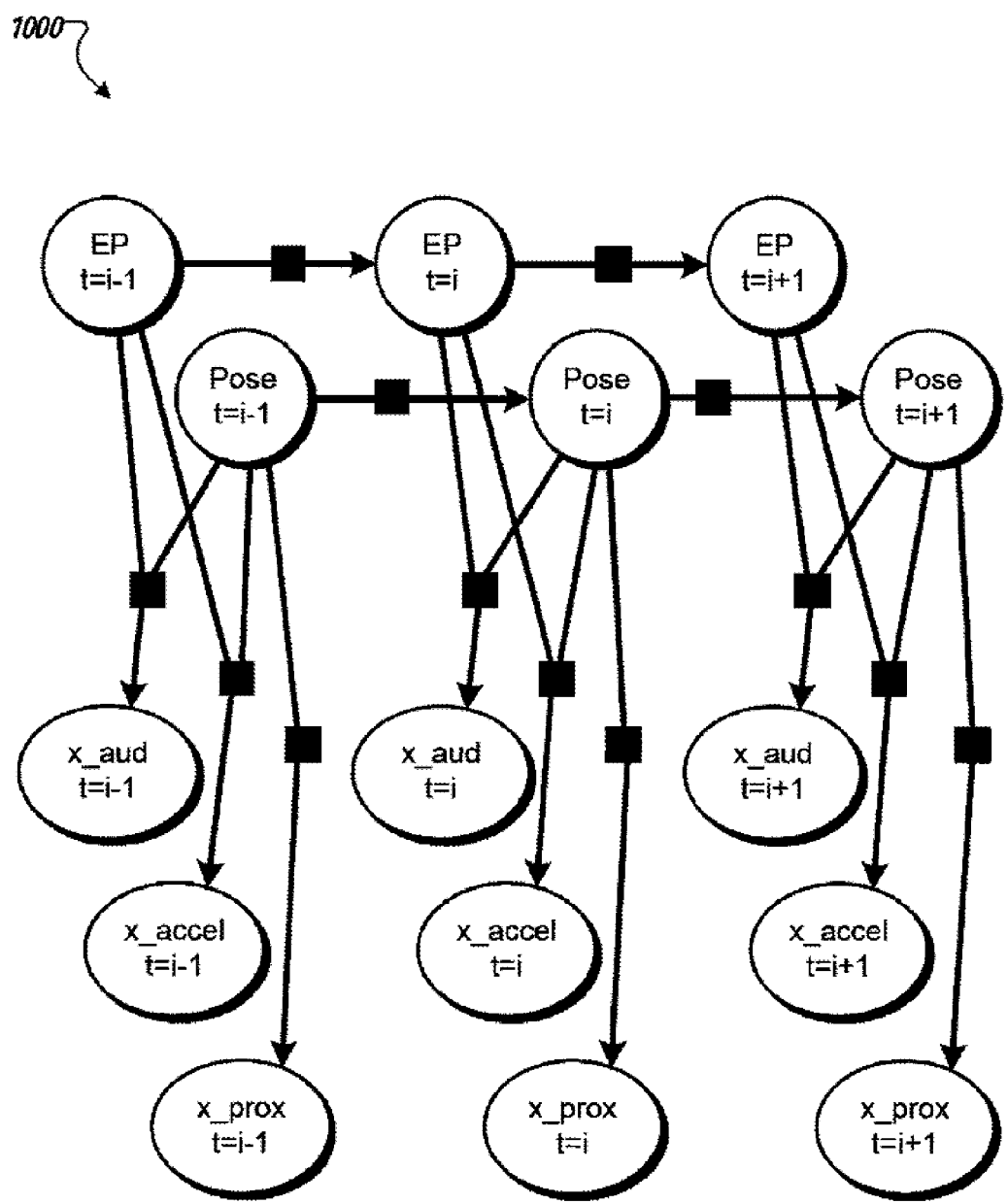
FIG. 10 illustrates a dynamic Bayes net for pose and speech detection.

FIG. 10 illustrates a dynamic Bayesian network for pose and speech detection. In particular, FIG. 10 shows a collection of EPP states chained together in a Hidden Markov Model 1000. In the illustrative implementation, the state EPP can be a cross product of EP state and the Pose state and transitions between the states can be defined by a transition matrix. Observations associated with the states can include the audio feature vector x_aud, acceleration feature vector x_accel, and proximity feature vector x_prox, for example. As set forth above, each observation may include a single Gaussian or Gaussian mixture model.

This approach can involve, for example, measuring data from the accelerometer at a given instant, and applying the acceleration and orientation parameters received to the model. In certain exemplary embodiments, rather than only applying the accelerometer data for a given instant to the model, the accelerometer data can be measured over a given time window on a rolling basis (e.g., all iterations over the past two seconds, or over the past thirty iterations of polling the accelerometer, etc.), and a representative value of the accelerometer data (e.g., the mean) can be applied to the model instead of any single value. Then the model can use the representative values of the accelerometer data to determine the probability of a certain gesture starting and/or ending based on the model. If the probability of a certain gesture starting or ending exceeds a certain threshold probability (e.g., 50%, 75%, 90%, 99% or higher)—which also can be defined by the model—the model can conclude that the gesture has occurred.

Alternatively, instead of simply computing a mean value from the multiple iterations, the samples can be stacked together. For example, with a three-axis accelerometer and a rolling window of thirty samples, the data from the thirty samples can be stacked to produce a ninety-dimensional vector, which can then be applied to the Gaussian Mixture Model or other suitable model.

Figure 21:
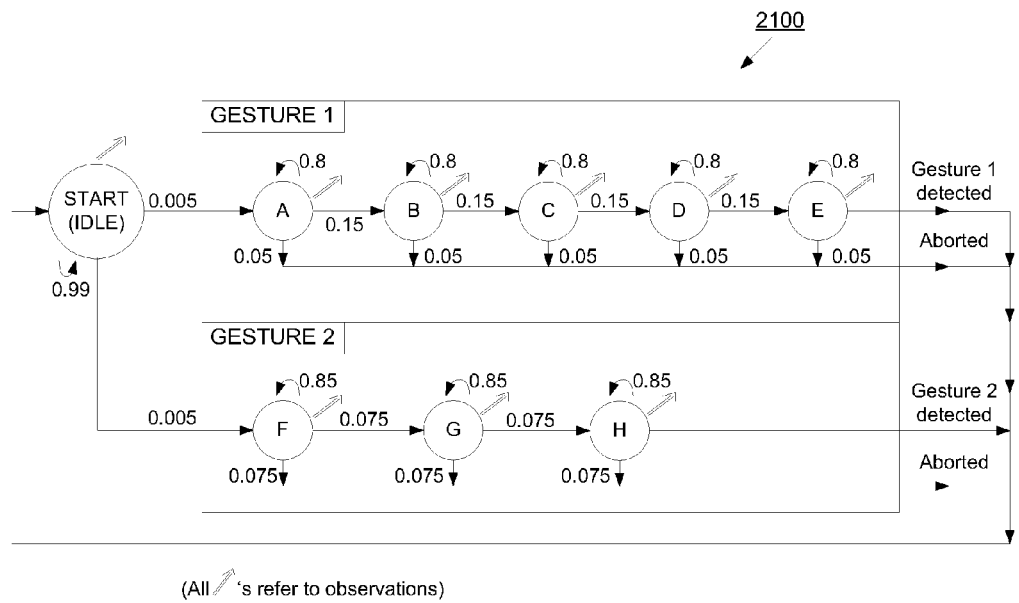
FIG. 21 illustrates a Hidden Markov Model for pose and speech detection, in accordance with certain alternative exemplary embodiments.

In other embodiments, certain steps can be taken to reduce battery consumption caused by constantly polling the accelerometer on a rolling basis and then applying the Gaussian model (or other suitable model) to the received accelerometer data. For example, to avoid draining the battery unnecessarily, the accelerometer can be polled less frequently when the device is stationary, rather than constantly polling the accelerometer and reapplying the Gaussian model for every sample received. When a threshold amount of movement is detected—for example, when the magnitude of the accelerometer vector is sufficiently different from the magnitude of the Earth's gravitational vector (e.g., by 1 N), or the magnitude of the rate of change of the vector exceeds some threshold (e.g., by 1 N/s)—the mobile device can begin polling the accelerometer and analyzing the received data on a rolling basis more frequently, as described above. For example, while a Gaussian Mixture Model can consist of 30 timeseries points collected at a rate of 20 Hz, for a total timeseries length of 1.5 seconds, the accelerometer can be polled at a lower frequency of 5 Hz and the model turned on only if a threshold is exceeded. Once the threshold has been crossed, the model can be run for some short period of time (e.g., 5 seconds) to capture possible subsequent gesture events In certain alternative exemplary embodiments, one or more of the observations can themselves be apportioned to different states, such that each state represents a different component of the sequence of movements that form the gesture. For example, FIG. 21 illustrates an alternative exemplary Hidden Markov Module 2100 for pose and speech detection, which apportions the accelerometer timeseries to different states A-H so that the observations of each state include Gaussian mixtures over the feature space of the current accelerometer reading. For example, each state A-H can include observations proximity, audio, etc., substantially as described above in connection with the variables x_aud, and x_prox in FIGS. 8-10, as well as other observations, such as the endpointer state.

Figure 22:
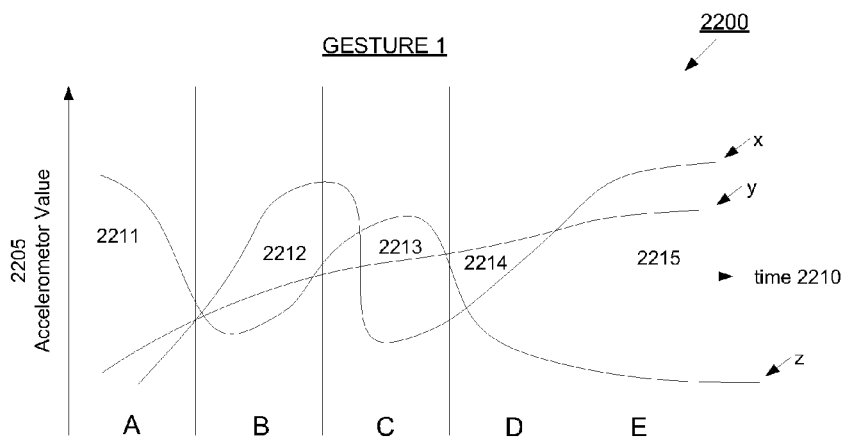
FIG. 22 is a graph illustrating accelerometer values over time when performing a gesture, in accordance with certain exemplary embodiments.
Figure 23:
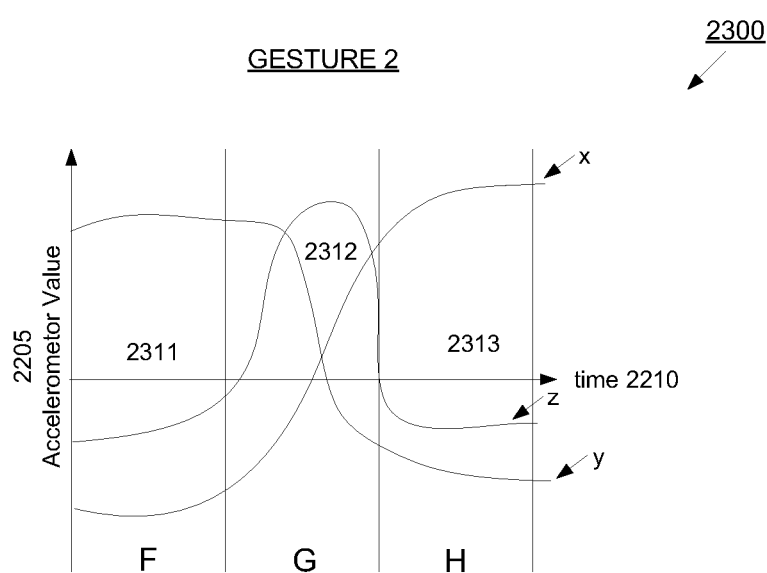
FIG. 23 is a graph illustrating accelerometer values over time when performing a gesture, in accordance with certain exemplary embodiments.

States A-E in FIG. 21 correspond to segmented portions A-E of graph 2200 of FIG. 22, and states F-H in FIG. 21 correspond to segmented portions F-H of graph 2300 of FIG. 23. The graph 2200 includes a vertical axis 2205 representing accelerometer value, and a horizontal axis 2210 representing time. Similarly, FIG. 23 includes a graph 2300, with a vertical axis 2305 representing accelerometer value, and a horizontal axis 2310 representing time.

Each exemplary graph 2200, 2300 illustrates x, y, and z accelerometer values over time when performing a particular gesture. More specifically, the graph 2200 illustrates accelerometer values x, y, and z over time when performing gesture 1, and graph 2300 illustrates accelerometer values x, y, and z over time when performing gesture 2. For example, gesture 1 can correspond to a "shake" gesture, and gesture 2 can correspond to a "to mouth" gesture. In certain exemplary embodiments, the accelerometer values x, y, z may be measured by an accelerometer of a device being used to perform the applicable gesture. For example, the accelerometer 213 of device 200 described above may be used to measure accelerometer values x, y, and z in certain exemplary embodiments.

Each graph 2200, 2300 is segmented according to time. In particular, graph 2200 is segmented into portions A-E, which correspond to different periods of time 2211-2215. Thus, portion A includes accelerometer values x, y, and z over time period 2211, portion B includes accelerometer values x, y, and z over time period 2212, and so forth. Similarly, graph 2300 is segmented into portions F-H, which correspond to different periods of time 2311-2313. Thus, portion F includes accelerometer values x, y, and z over time period 2311, portion G includes accelerometer values x, y, and z over time period 2312, and portion H includes accelerometer values x, y, and z over time period 2313.

Apportioning the accelerometer timeseries to different states, as depicted in FIG. 21, allows the Hidden Markov Model 2100 to represent information about the timeseries itself, which can improve gesture recognition accuracy. For example, this approach may allow the Hidden Markov Model 2100 to move through its states at a rate that can match the rate at which the user is performing the gesture, as opposed to using a static Gaussian Mixture Model to represent the timeseries. Although FIGS. 22 and 23 disclose apportioning the accelerometer timeseries into five and three states, respectively, a person of ordinary skill in the art will recognize that the accelerometer timeseries for a gesture may be apportioned into any number of states, in certain alternative exemplary embodiments. A greater number of states generally corresponds to greater accuracy of the Hidden Markov Model 2100. However, more states can require more processing and, therefore, greater cost. These considerations should be balanced when determining how to apportion the accelerometer timeseries. In certain exemplary embodiments, this process can be automated. For example, the Baum-Welch algorithm or another procedure may be used to apportion the accelerometer timeseries.

Figure 24:
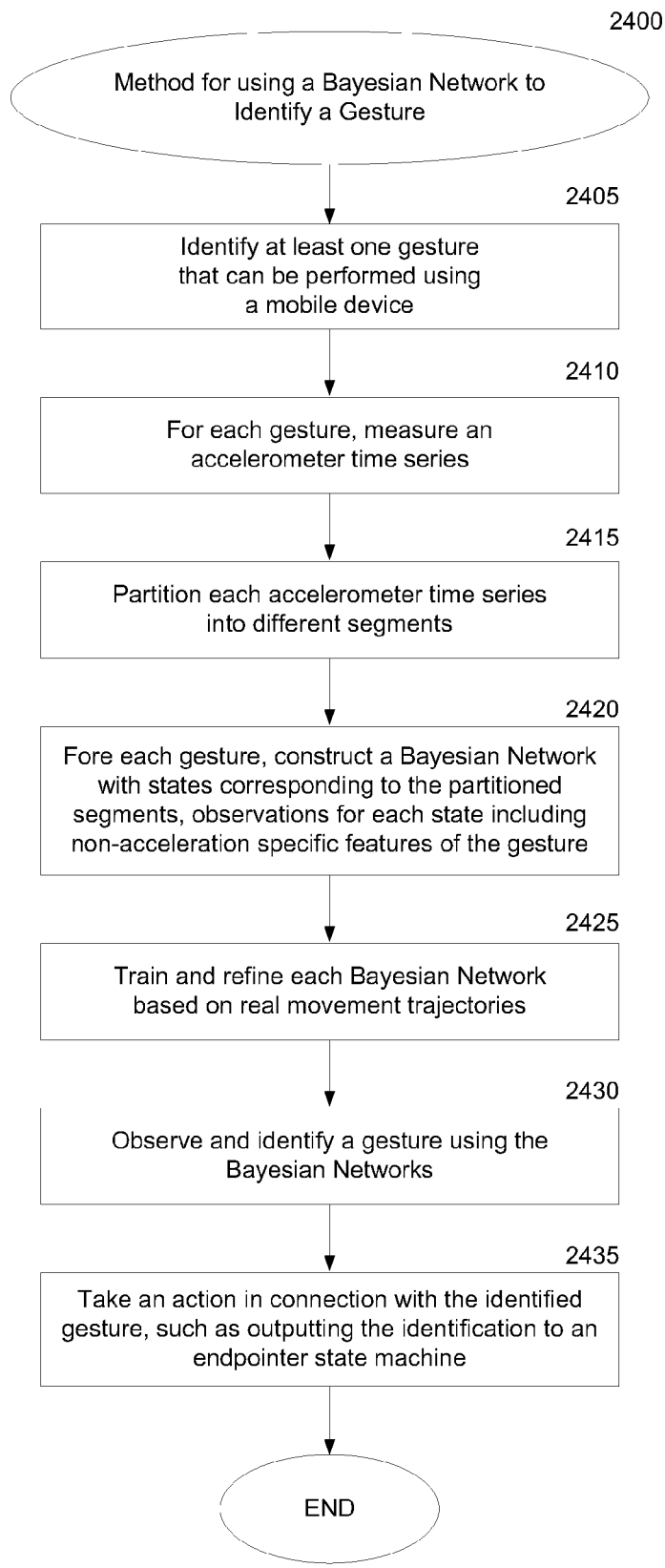
FIG. 24 is a block flow diagram illustrating a method for using a Bayesian network to identify a gesture completed in connection with a mobile device, in accordance with certain exemplary embodiments.

FIG. 24 is a block flow diagram illustrating a method 2400 for using a Bayesian network to identify a gesture completed in connection with a mobile device, in accordance with certain exemplary embodiments. The method 2400 is described in connection with the system 200 of FIG. 2. In block 2405, a software module, such as the gesture classifier 225 or another software module of the device 205 or remote computing device 245, identifies at least one gesture that can be performed using a mobile device (such as the device 205). For example, the gesture(s) may include "shake," "flip," "to mouth," "from mouth," "facing user," "to ear," "from ear," etc.

In block 2410, the software module measures, for each gesture, an accelerometer timeseries, which includes accelerometer values over a period of time in which at least one mobile device (such as the device 205) completes the gesture, substantially as described above in connection with FIGS. 22 and 23. For example, the accelerometer 213 of the device 205 or another software module in the device 205 or a remote moving device 245 may measure the accelerometer values. The software module also measures other features of the gesture over time, such as proximity, audio, and/or endpointer state.

In block 2415, the software module partitions the accelerometer values into a plurality of different segments. Each segment includes measured accelerometer values over a subset of time, substantially as described above in connection with FIGS. 21-23. In block 2420, the software module constructs, for each gesture, a Bayesian network that includes a plurality of states. Each state corresponds to one of the plurality of different segments partitioned in block 2415, substantially as described above in connection with Hidden Markov Model 2100. For each state, the Bayesian network includes one or more observations corresponding to the (non-accelerometer specific) feature(s) measured in block 2410. Each state has a probability distribution, such as a Gaussian distribution, over the possible observations.

In block 2425, the software module trains and refines each Bayesian network constructed in block 2420. For example, the software module can train the Bayesian network(s) based on real movement trajectories of one or more mobile devices completing the gesture(s), using an Expectation Maximization algorithm or another process. In block 2430, the software module observes a gesture and uses the Bayesian network constructed in block 2420 to identify the gesture. In particular, as described above in connection with FIGS. 7-10 and 21, the probability distributions associated with each state of the Bayesian network may be used to drive gesture identification.

Using the Bayesian network 2100 depicted in FIG. 21 as an example, there are two possible gestures—gesture 1 and gesture 2—which may be performed from a start (or idle) position. There is a probability of 0.99 that the user will stay in the start position, a 0.005 probability that the end user will transition from the start position to state A, and a 0.005 probability that the end user will transition from the start position to state F. If the user transitions from start to state A, there is a 0.15 transition probability that the user will transition from state A to state B, a 0.05 probability that the user will revert back from state A to the start position, and a 0.8 probability that the user will stay in state A. Similarly, if the user transitions from start to state F, there is a 0.075 transition probability that the user will transition from state F to state G, a 0.075 probability that the user will revert back to the start position, and a 0.85 probability that the user will stay in state F. As reflected in FIG. 21, a greater number of states for a particular gesture generally corresponds to a higher transition probability between states. If the user transitions all the way to state E, the software module can determine that gesture 1 has been performed. Similarly, if the transitions all the way to state H, the software module can determine that gesture 2 has been performed.

In certain exemplary embodiments, inference to determine a speech/noise state can be performed by the Viterbi algorithm or a Forward-Backward algorithm. In some cases, more complex states can be used. For instance the environment of the user (e.g., in the street, in a home, in a moving car, in a restaurant, etc.) or device could be inferred based upon signals from the sensors and used in the determination of the pose and endpointer state.

In block 2435, an action is taken in connection with the gesture identification in block 2425. For example, this action may include outputting the gesture identification to an endpointer state machine, such as endpointer state machine 900, as described above, sending an email, refreshing a page, opening a specific software application, starting or stopping audio recording, taking a picture, etc. Thus, the Bayesian network created in block 2420 may be used to detect gestures using a mobile device and drive processes on the mobile device in response to such gestures.

As would be recognized by a person of ordinary skill in the art, for accurate gesture detection, the timeseries used for training and the timeseries data during gesture classification should be aligned. Because timeseries are continuous, portions corresponding to gesture events are extracted for gesture detection purposes. The extracted portions could be marked manually by an operator or detected automatically as part of the detection process described above. In either case, the extracted portions may need to be trimmed to line up with the training examples.

One approach to this is to choose a deterministically chosen reference point in each timeseries and align them so that these reference points lie at the same point in time. For example, the reference point might be the first point at which a reference point of the device 205 (such as the "ref" point in FIG. 20) exceeds a threshold distance from its usual magnitude due to gravity, a point in the trajectory with the maximum or minimum distance of the reference point to a point of origin (such as the value "r" in FIG. 20), or a point that has the highest magnitude of the first-order differentiate of the acceleration vector. The training examples can also be trimmed at the start and end to remove unnecessary movements before or after the gesture and other forms of noise that might be present. This trimming can be done based on the known length of the gesture or based on the output of a preliminary classifier, for example. In certain exemplary embodiments, the values at the start and end might be removed completely so that they are not used in training, or they might be replaced with values that represent a best guess as to the starting and ending orientation of the gesture in the training example.

Figure 25:
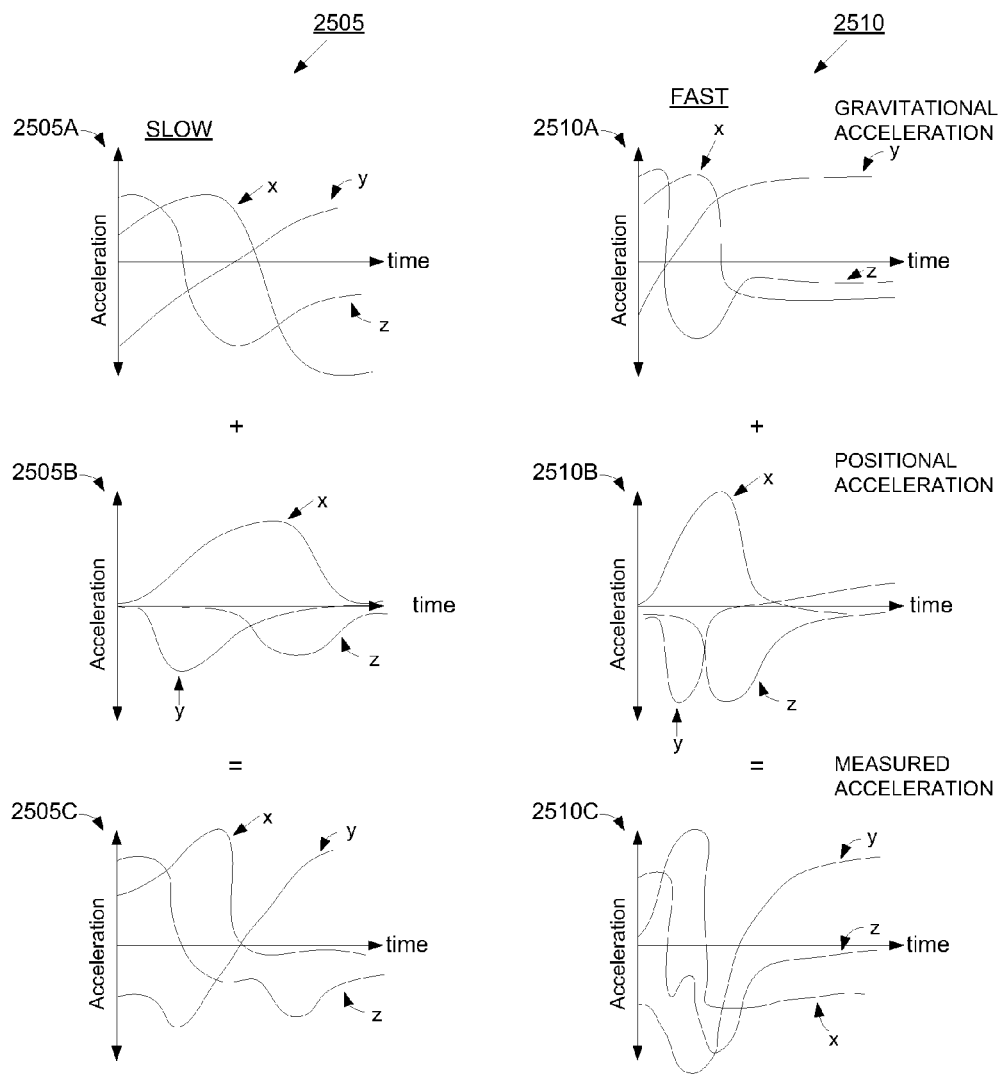
FIG. 25 includes graphs illustrating accelerometer values over time for fast and slow gestures, in accordance with certain exemplary embodiments.

Depending on the coordinate system used when running the Bayesian network in block 2425, the trajectory of the acceleration vector may vary according to the speed of the gesture. For example, if a spherical polar coordinate system is used, the acceleration vector can include a gravity vector, which does not substantially change according to the speed, superimposed with a positional acceleration vector, which does substantially change according to speed, as illustrated in FIG. 25. FIG. 25 includes a first series of graphs 2505 corresponding to a slow gesture and a second series of graphs 2510 corresponding to a slow gesture. Graph 2505A illustrates the gravitational acceleration over time of the slow gesture; graph 2505B illustrates the positional acceleration over time of the slow gesture; and graph 2505C illustrates the sum of graphs 2505A and 2505B, i.e., the measured acceleration vector over time for the slow gesture. Similarly, graph 2510A illustrates the gravitational acceleration over time of the fast gesture; graph 2510B illustrates the positional acceleration over time of the fast gesture; and graph 2510C illustrates the sum of graphs 2510A and 2510B, i.e., the measured acceleration vector over time for the fast gesture.

Figure 26:
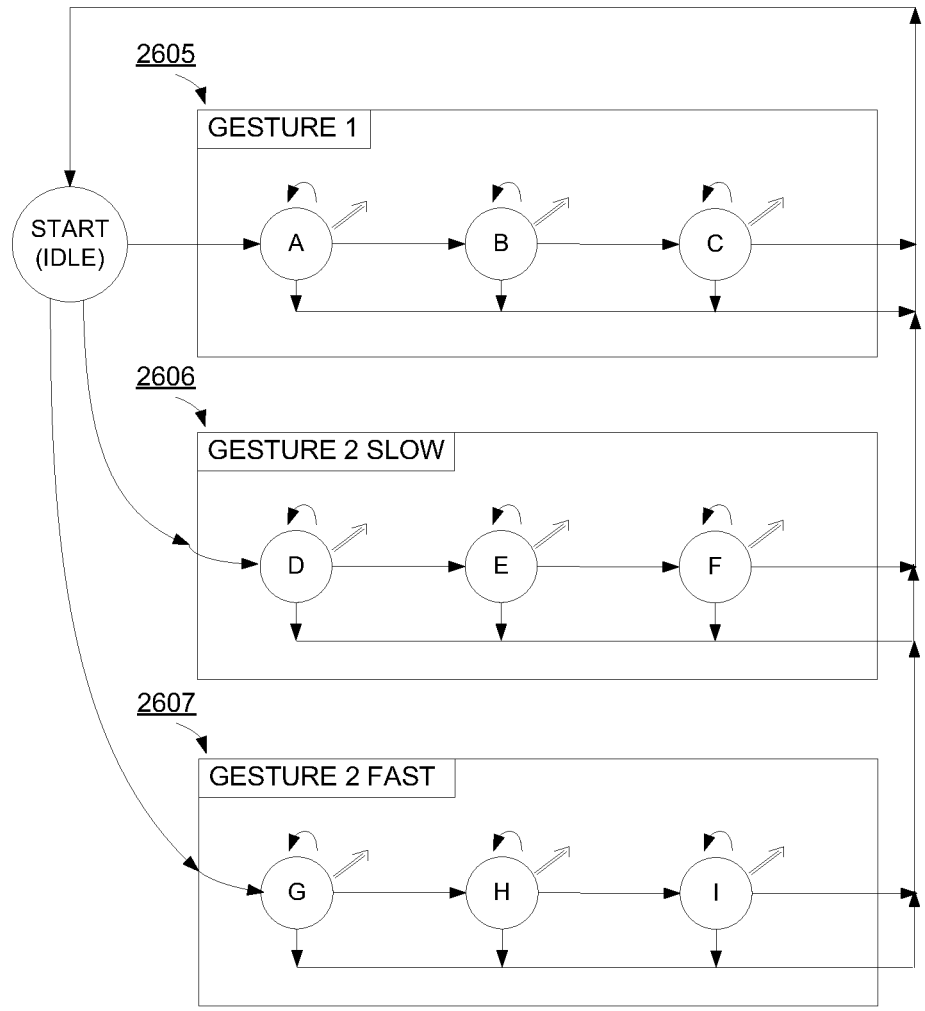
FIG. 26 illustrates parallel Hidden Markov Models for identifying a gesture, in accordance with certain exemplary embodiments.

This variation in the trajectory of the acceleration vector can be addressed in certain alternative exemplary embodiments by placing multiple Bayesian networks, such as the Hidden Markov Model 1000 and/or the Hidden Markov Model 2100, in parallel, each representing the same gesture executed at a different speed. For example, FIG. 26 illustrates three parallel Hidden Markov Models 2605-2607, with Hidden Markov Model 2605 corresponding to a first gesture and Hidden Markov Models 2606-2607 corresponding to the same, second gesture. Hidden Markov Model 2606 corresponds to the second gesture being performed at a slow speed; and Hidden Markov Model 2607 corresponds to the second gesture being performed at a slow speed. For example, the Hidden Markov Models 2606-2607 can be trained from real trajectories recorded from mobile devices, such as the mobile device 205, clustered according to the total time taken to complete the second gesture. Thus, the gesture identification may not be materially impacted by a difference in speed used when performing the second gesture. In other words, the second gesture may be detected regardless of how quickly or slowly the user completes the second gesture. Although FIG. 26 illustrates only two parallel Bayesian networks for the two different speeds of the second gesture, a person of ordinary skill in the art will recognize that any number of parallel networks may be used to further differentiate the networks based on speed.

Figure 27:
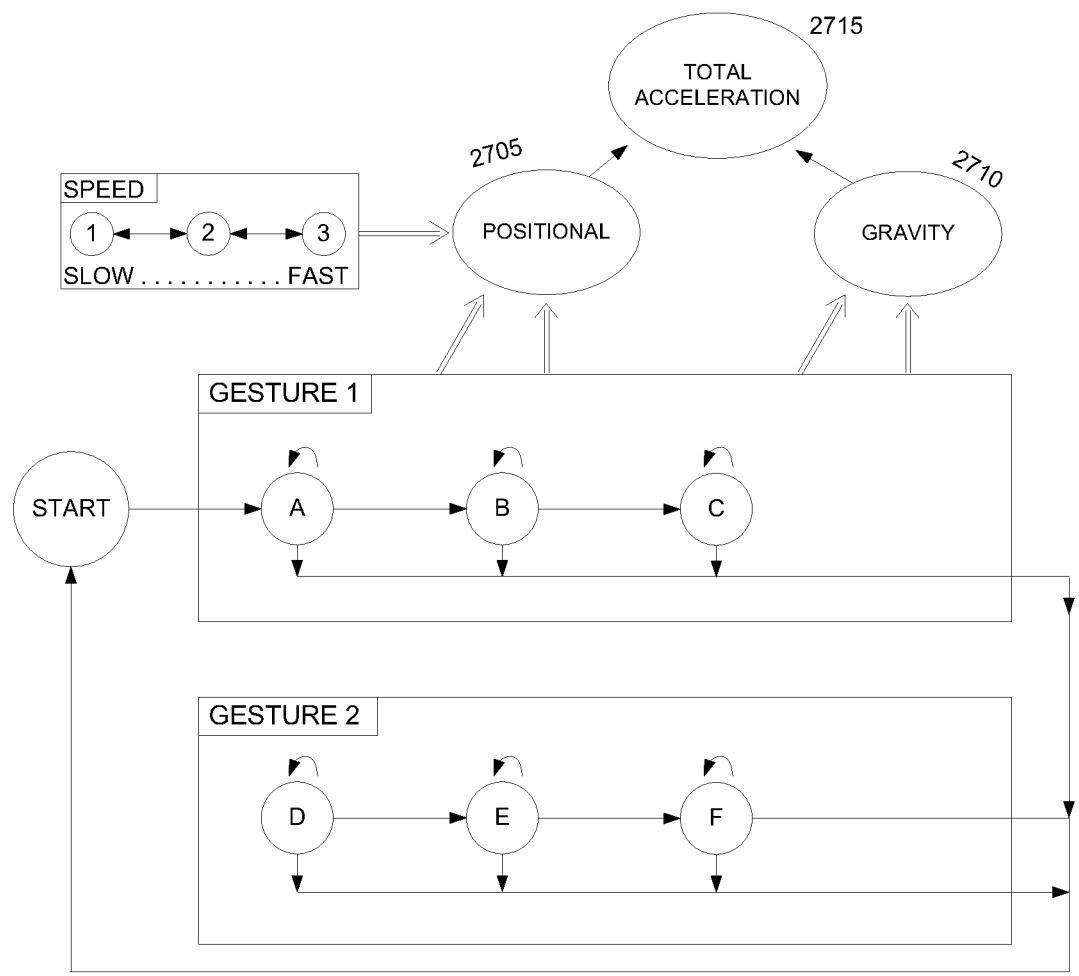
FIG. 27 illustrates a Bayesian network that includes a set of states representing the speed of the gesture, in accordance with certain exemplary embodiments.

In addition to using parallel Bayesian networks, or in the alternative, the Bayesian network can include a set of states that represent the speed of the gesture. For example, as illustrated in FIG. 27, the trajectory can be represented as states 2705 and 2710 that output a positional acceleration component, which can be increased in magnitude according to the state of the gesture speed states, and a gravitational acceleration component, which can remain constant at each represented point in the timeseries, respectively. For example, in the example depicted in FIG. 27, the positional acceleration observation for a particular gesture state may be multiplied by 0.5 for speed state one (corresponding to a slow speed) or 2.0 for speed state three (corresponding to a fast speed). The network can include an output node 2715, which sums these two components to model the actual total acceleration vector. By separately measuring the speed of the gesture being performed, gestures performed at a variety of speeds can be recognized by the device even if the device is not trained to recognize the gestures at a given speed. In addition, the timing and performance of a corresponding reaction to the gesture (e.g., activating a microphone and/or speaker at the appropriate time, which may not necessarily be immediately after the completion of the gesture) specified in the model can be adjusted accordingly.

Figure 11:
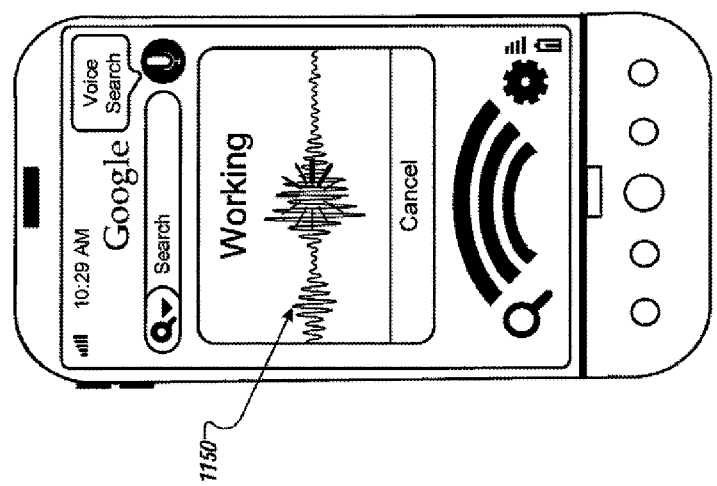
FIGS. 11-12 show screenshots of an example graphical user interface for providing feedback about audio signal quality.
Figure 11:
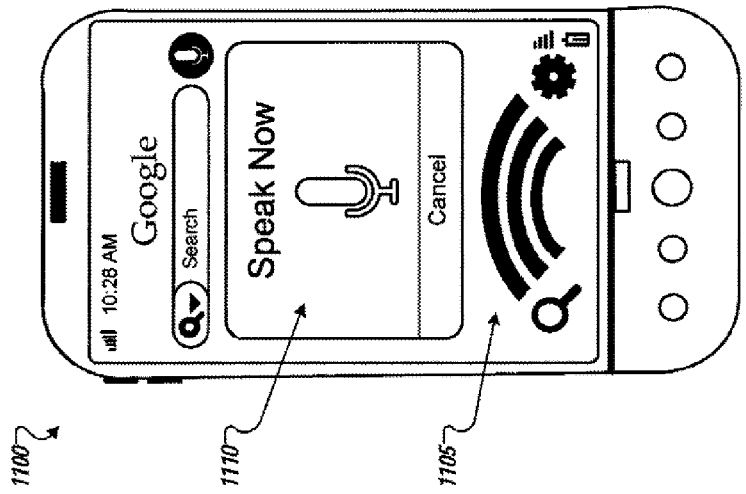
Figure 12:
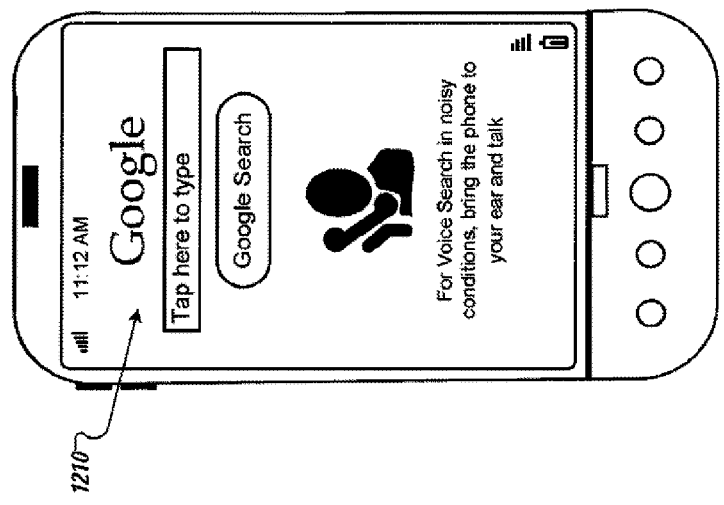
Figure 12:
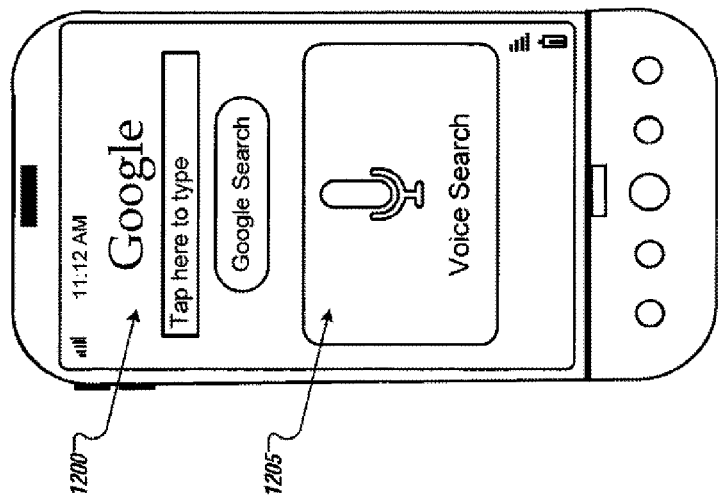

FIGS. 11 and 12 show screenshots of example graphical user interfaces for providing feedback about audio signal quality. In some implementations, the illustrative graphical user interfaces may provide feedback regarding audio signal quality before, during, and/or after a user speaks commands into a mobile computing device. For example, before a user speaks, the graphical user interface can provide visual or audio feedback that may indicate whether speech will be accurately captured by the device. In some cases, the feedback may indicate that the user should use the device in a particular manner (e.g., place the device in a particular pose) or warn the user that background noise may impair the detection and accurate recording of speech. In some implementations, the feedback may be used to limit the modes of operation available to the user or suggest an operating mode that may increase the chance of successful voice capture.

In some cases, as the user is speaking, the graphical user interface can provide feedback on the quality of the audio captured by the device. For example, a visual indication of the amplitude of the recorded audio can be displayed on the screen while the user is speaking. This may provide the user an indication of whether background noise is interfering with sound recording or whether the user's commands are being properly recorded. After the user has finished speaking, the graphical user interface may display a representation of the captured voice commands to the user.

The graphical user interface 1100 depicted in FIG. 11 provides feedback about audio signal quality. The illustrative graphical user interface 1100 can, in some cases, include a message area 1105. Visual indicators such as text and waveforms may be displayed in the message area 1105 to indicate, for example, a mode of operation of the device or a representation of recorded audio. For example, as shown in FIG. 11, when the device is in a recording mode, a "Speak Now" message may be displayed in the message area 1110. Messages indicating that current noise conditions may interfere with speech recording may be displayed in message area 1105. In some situations, the message area 1105 may also show messages allowing a user to continue or cancel the recording operation. The preceding examples are illustrative; other types of data may be displayed in the message area 1105.

The illustrative graphical user interface 1100 can also include a visual audio level indicator 1110. In an illustrative implementation, the visual audio level indicator 1110 can indicate the amplitude of audio captured by a mobile device. For example, as a user is speaking the indicator 1110 can go up an amount related to the amplitude of the detected speech. In some circumstances, the indicator 1110 may allow a user to determine whether background noise is interfering with speech recording. For example, if the indicator 1110 goes up before the user begins speaking, background noise may interfere with speech recording. If the indicator 1110 does not go up while the user is speaking, this may indicate the user's voice commands are not being properly recorded.

In some cases, the audio level indicator 1110 can display a representation of the log of the Root Means Square (RMS) level of a frame of audio samples. The log RMS level of the frame of audio samples may represent a background noise level. In some cases, the RMS value may be equal to $$\sqrt{\sum_0^t x_t^2}.$$

In some cases, the log RMS level of a frame of audio samples may be determined by the following equation:

$$AL = 20 * \log_{10}(RMS) \quad (3)$$

Here, $x_t$ can be an audio sample value at a time t.

In some cases, audio level indicator 1110 may display a representation of a signal-to-noise ratio; i.e., strength of a speech signal relative to background noise. For example, the signal-to-noise ratio can be calculated using the following equation:

$$AL_{SNR} = 20 * \log_{10}(RMS/NL) \quad (4)$$

Like equation (3), $x_t$ can be an audio sample value at a time t, while NL can be an estimate of a noise level.

In an alternative implementation, the audio level indicator 1110 can display a representation of a combination of the log RMS level of a frame of audio samples and a signal-to-noise ratio. For example, this combination can be determined as follows:

$$L = \alpha(AL) + \beta(AL_{SNR}) \quad (5)$$

In this equation, a and p can be variables that can scale the background noise and signal-to-noise. For example, a can scale the RMS level of a frame of audio samples to represent decibel values (e.g., such that 100 db equals a full scale RMS level of a frame of audio). p can used to scale a signal-to-noise ratio in a similar fashion.

In some implementations, one or more of the background noise level, signal-to-noise ratio, or a combination of the two can be displayed on the graphical user interface 1100. For example, one or more of these measures may be displayed on the screen in different colors or in different areas of the screen. In some cases, one of these measures may be superimposed on one of the others. For example, data representing a signal-to-noise ratio may be superimposed on data representing a background noise level.

FIG. 11 also illustrates an example graphical user interface that includes visual waveform indicator 1150. The illustrative visual waveform indicator 1150 can show a captured audio signal to a user. The waveform may, in some cases, be a stylized representation of the captured audio that represents an envelope of the speech waveform. In other cases, the waveform may represent a sampled version of the analog audio waveform.

The illustrative waveform may permit the user to recognize when a device has failed to record audio. For example, after a user has spoken an voice command, the application can show a waveform that represents the captured audio. If the waveform is a flat line, this may indicate that no audio was recorded.

FIG. 12 illustrates an example graphical user interface in different operating conditions. In some cases, it may be useful to adjust the options for interacting with a mobile device based on a level of background noise. For example, a user may want to enter voice commands into a mobile device. Depending on the background noise level, the user may need to hold the device close to his mouth for voice commands to be recognized by the device. However, in quieter situations the user may be able to hold the device at arm's length and enter voice commands. The illustrative graphical user interface may present a user with an interaction option based on the probability that the device can correctly recognize a voice command given a detected level of background noise. For example, as shown in FIG. 12, in quiet conditions a graphical user interface may present a voice search option, represented by the graphical voice search button 1205. In circumstances where the background noise level is high, the voice search button 1205 can be removed and a message indicating that the mobile device should be placed closer to the user's mouth may be displayed, as shown by the right-most image of the graphical user interface 1210. By holding the device closer to the user (e.g., holding the device in telephone pose), speech power may be increased by 15-20 decibels, making correct speech recognition more likely.

Figure 13:
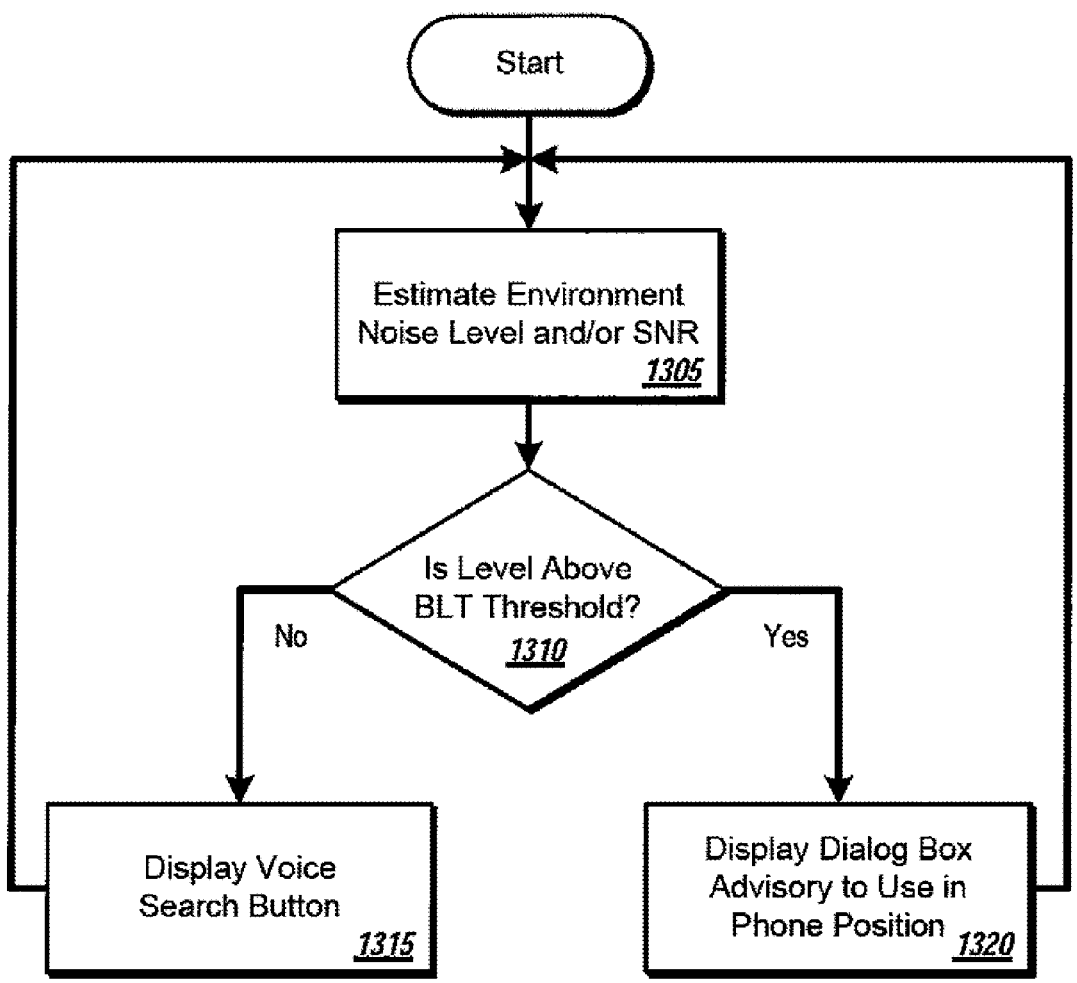
FIG. 13 illustrates an example process for background noise based mode selection.
Figure 14:
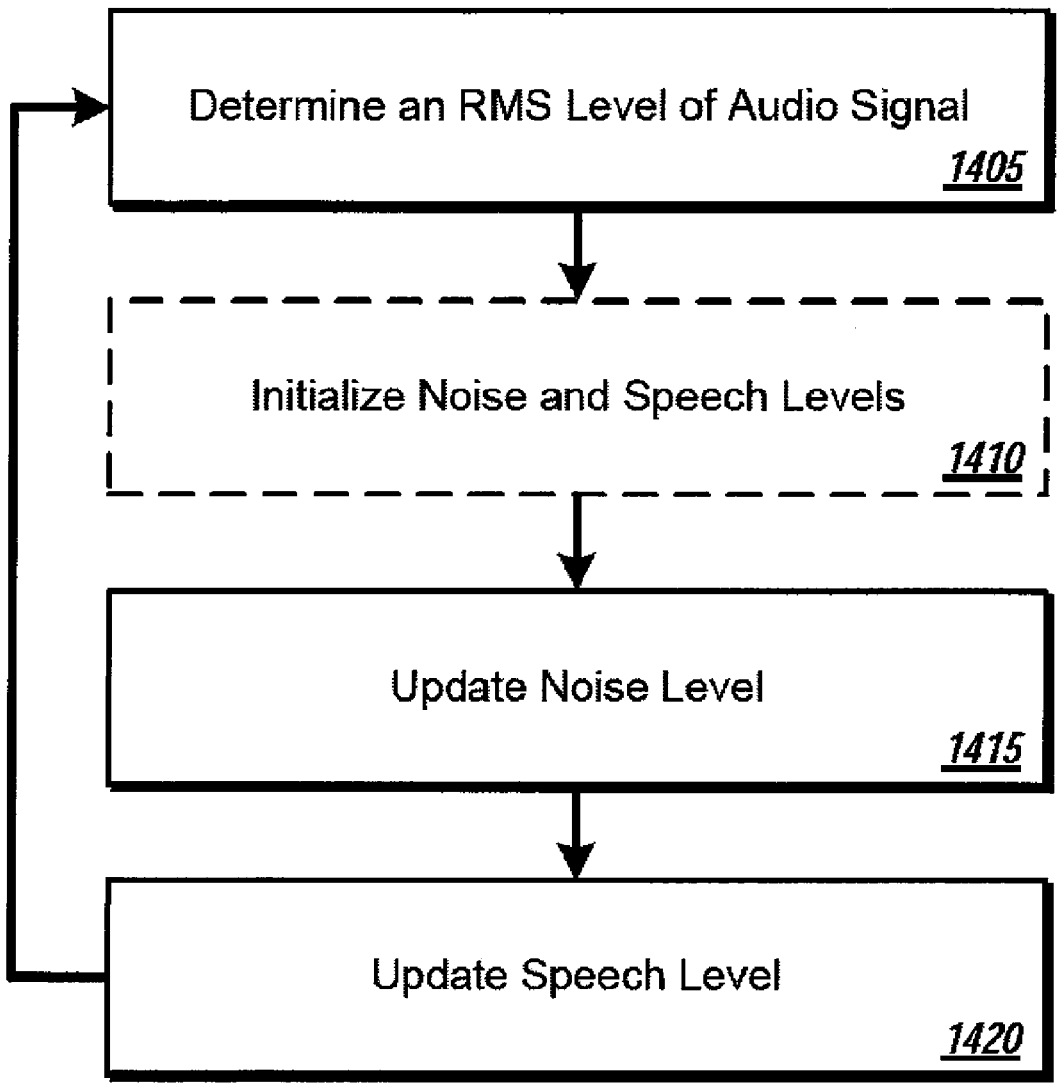
FIG. 14 shows an illustrative method of background noise level estimation.

FIGS. 13 and 14 are flow charts of example processes 1300 and 1400, respectively, for background noise based mode selection. The processes 1300 and 1400 may be performed, for example, by a system such as the system shown in FIG. 2 and, for clarity of presentation, the description that follows uses that system as the basis of an example for describing the processes. However, another system, or combination of systems, may be used to perform the processes 1300 and 1400.

FIG. 13 illustrates an example process 1300 for background noise based mode selection. The example process 1300 block begins at block 1305 where environmental noise and/or a signal-to-noise ratio are estimated. For example, environmental noise and signal-to-noise ratio can be calculated using equations (3) and (4) above. At block 1310, it is determined whether the environmental (i.e., background) noise and/or a signal-to-noise ratio are above a background noise level threshold value. For example, in one implementation, a device 205 may send an acoustic signal, as well as noise and speech level estimates and other environment-related parameters to a server. The server may determine whether the estimated noise and speech level estimates are above a background noise level threshold value. The background noise level threshold value may be based on prior noise and speech level estimates, environment-related parameters, and acoustic level signals sent to the server.

In some cases, the device 205 can correlate a particular noise level or type of environmental sound to recognition accuracy. For example, a noise level (NL) of 40 dB fan noise may correspond to a word error rate (WER) of 20%, while the WER might be 50% when the noise is 70 dB (assuming the user speaks at 80 dB on average). These values may be transmitted to a server (e.g., remote device 245) that can collect statistics to make a table from NL to WER.

Some noise types may be worse than others. For example, 50 dB cafeteria noise might have the same WER as 70 dB fan noise. The device 205 can perform environment characterization of this type by sending the audio to a server (such as remote device 245) for mode determination.

If the background noise and/or signal-to-noise ratio is above the background level threshold, the process proceeds to block 1315 where a voice search button is displayed as shown in FIG. 12. If not, a dialog box or message may be displayed advising a user to use the device 205 in phone position at block 1320. Regardless, the method 1300 returns to block 1305 after block 1315 or block 1320.

FIG. 14 shows an illustrative method 1400 of background noise level estimation. The method 1400 begins at block 1405 where an RMS level of an audio sample is determined. For example, a microphone 217 can be used to capture a frame of audio signals (e.g., 20 milliseconds of audio) from the environment surrounding the mobile device 205. The RMS level of the frame can be determined according to equation (3) above.

Optionally, at block 1410 noise and speech levels may be initialized. For instance, if noise and speech levels have not already been set (as may be the case when the method 1400 is executed for the first time) noise and speech levels may be initialized using an RMS level of an audio sample. In an illustrative example, the noise and speech levels may be set using the following equations:

$$NL = (\alpha * NL) + ((1-\alpha) * RMS) \quad (6)$$

$$SL = (\alpha * NL) + ((1-\alpha) * 2RMS) \quad (7)$$

In equations (6) and (7), RMS can be an RMS level of an audio sample and $\alpha$ is a ratio of a previous estimate of noise or speech and a current estimate of noise or speech. This ratio may be initially set to zero and increase to (k−1/k), where k is a number of time blocks in an initial adaptation period.

At block 1415, a noise level may be updated. For example, a noise level can be compared with a RMS level of an audio sample, and the noise level can be adjusted according to the following equation:

$$NL = (UpdateRate_{NL} * NL) + (UpdateRate_{RMS} * RMS) \quad (8)$$

Like equation (7), RMS can be an RMS level of an audio sample. In some cases, the sum of $UpdateRate_{NL}$ and $UpdateRate_{RMS}$ can equal one. If the noise level is less than an RMS level of an audio sample, $UpdateRate_{NL}$ may be 0.995, while $UpdateRate_{RMS}$ may be 0.005. If the noise level is greater than the RMS level of an audio sample, the noise level may be adjusted using equation (8), but $UpdateRate_{NL}$ may be 0.95, and $UpdateRate_{RMS}$ may be 0.05.

At block 1430, a speech level may be updated. For example, a speech level can be compared with an RMS level of an audio sample, and the speech sample can be adjusted according to the following equation:

$$SL = (UpdateRate_{SL} * SL) + (UpdateRate_{RMS} * RMS) \quad (9)$$

If the speech level is greater than an RMS level of the audio sample, $UpdateRate_{SL}$ may equal 0.995 and $UpdateRate_{RMS}$ can equal 0.005. If the speech level is less than an RMS level of the audio sample, $UpdateRate_{SL}$ may equal 0.995 and $UpdateRate_{RMS}$ can equal 0.005. After the speech level is updated, the method 1400 may return to block 1405.

In some implementations, other background noise level estimation methods may be used. For example, the methods disclosed in the following papers, which are herein incorporated by reference, may be used: "Assessing Local Noise Level Estimation Methods: Application to Noise Robust ASR" Christophe Ris, Stephane Dupont. Speech Communication, 34 (2001) 141-158; "DySANA: Dynamic Speech and Noise Adaptation for Voice Activity Detection" Ron J. Weiss, Trausti Kristjansson, ICASSP 2008; "Noise estimation techniques for robust speech recognition" H. G. Hirsch, C Ehrlicher, Proc. IEEE Internat. Conf. Audio, Speech Signal Process, v12 il, 59-67; and "Assessing Local Noise Level Estimation Methods" Stephane Dupont, Christophe Ris, Workshop on Robust Methods For Speech Recognition in Adverse Conditions (Nokia, COST249, IEEE), pages 115-118, Tampere, Finland, May 1999.

Figure 15:
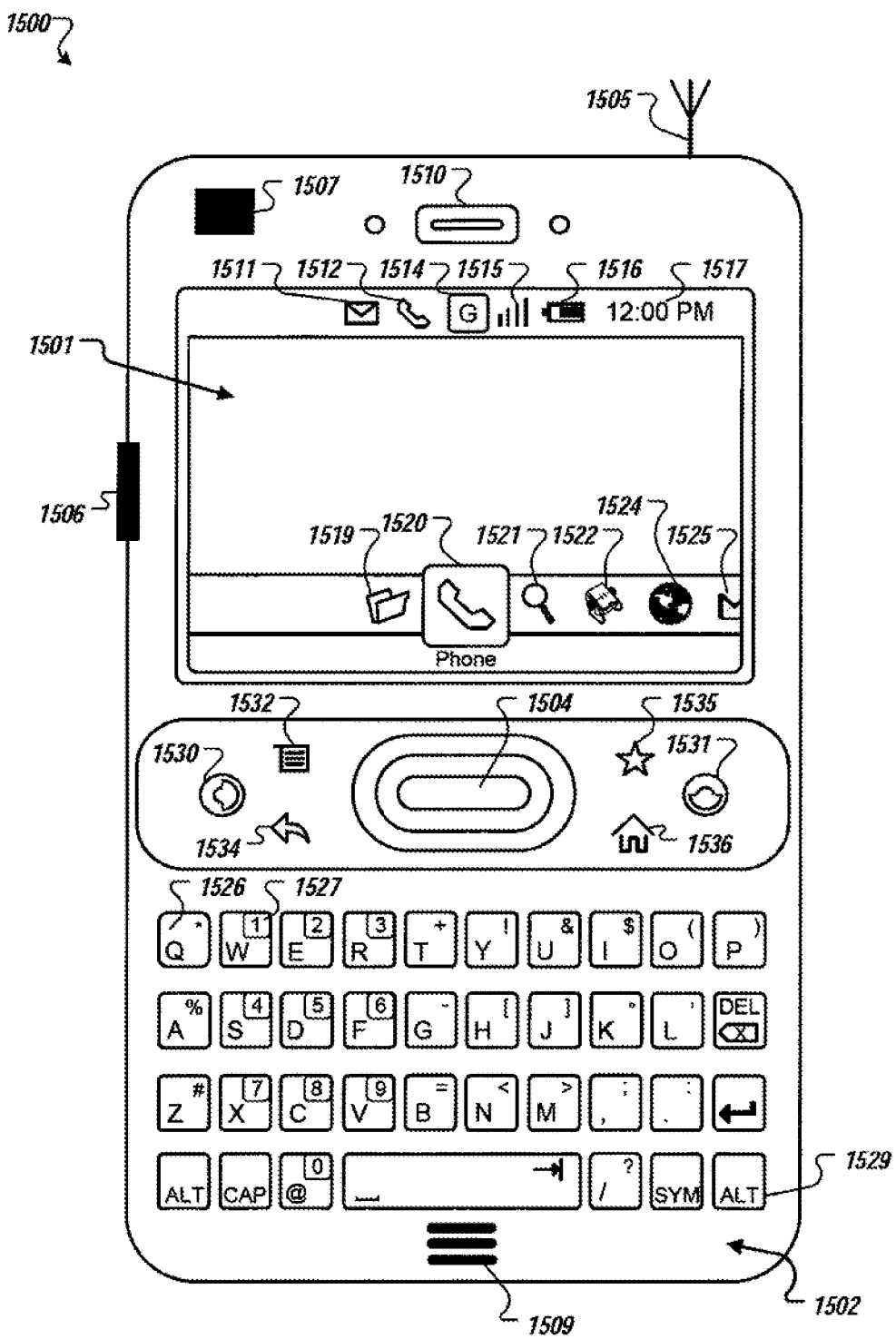
FIG. 15 is a schematic representation of an exemplary mobile device that implements embodiments of the multisensory speech detection method described herein.

Referring now to FIG. 15, the exterior appearance of an exemplary device 1500 that implements the multisensory speech detection methods described above is illustrated. In more detail, the hardware environment of the device 1500 includes a display 1501 for displaying text, images, and video to a user; a keyboard 1502 for entering text data and user commands into the device 1500; a pointing device 1504 for pointing, selecting, and adjusting objects displayed on the display 1501; an antenna 1505; a network connection 1506; a camera 1507; a microphone 1509; and a speaker 1510. Although the device 1500 shows an external antenna 1505, the device 1500 can include an internal antenna, which is not visible to the user.

The display 1501 can display video, graphics, images, and text that make up the user interface for the software applications used by the device 1500, and the operating system programs used to operate the device 1500. Among the possible elements that may be displayed on the display 1501 are a new mail indicator 1511 that alerts a user to the presence of a new message; an active call indicator 1512 that indicates that a telephone call is being received, placed, or is occurring; a data standard indicator 1514 that indicates the data standard currently being used by the device 1500 to transmit and receive data; a signal strength indicator 1515 that indicates a measurement of the strength of a signal received by via the antenna 1505, such as by using signal strength bars; a battery life indicator 1516 that indicates a measurement of the remaining battery life; or a clock 1517 that outputs the current time.

The display 1501 may also show application icons representing various applications available to the user, such as a web browser application icon 1519, a phone application icon 1520, a search application icon 1521, a contacts application icon 1522, a mapping application icon 1524, an email application icon 1525, or other application icons. In one example implementation, the display 1501 is a quarter video graphics array (QVGA) thin film transistor (TFT) liquid crystal display (LCD), capable of 16-bit or better color.

A user uses the keyboard (or "keypad") 1502 to enter commands and data to operate and control the operating system and applications that provide for multisensory speech detection. The keyboard 1502 includes standard keyboard buttons or keys associated with alphanumeric characters, such as keys 1526 and 1527 that are associated with the alphanumeric characters "Q" and "W" when selected alone, or are associated with the characters "*" and "1" when pressed in combination with key 1529. A single key may also be associated with special characters or functions, including unlabeled functions, based upon the state of the operating system or applications invoked by the operating system. For example, when an application calls for the input of a numeric character, a selection of the key 1527 alone may cause a "1" to be input.

In addition to keys traditionally associated with an alphanumeric keypad, the keyboard 1502 also includes other special function keys, such as an establish call key 1530 that causes a received call to be answered or a new call to be originated; a terminate call key 1531 that causes the termination of an active call; a drop down menu key 1532 that causes a menu to appear within the display 1501; a backward navigation key 1534 that causes a previously accessed network address to be accessed again; a favorites key 1535 that causes an active web page to be placed in a bookmarks folder of favorite sites, or causes a bookmarks folder to appear; a home page key 1536 that causes an application invoked on the device 1500 to navigate to a predetermined network address; or other keys that provide for multiple-way navigation, application selection, and power and volume control.

The user uses the pointing device 1504 to select and adjust graphics and text objects displayed on the display 1501 as part of the interaction with and control of the device 1500 and the applications invoked on the device 1500. The pointing device 1504 is any appropriate type of pointing device, and may be a joystick, a trackball, a touch-pad, a camera, a voice input device, a touch screen device implemented in combination with the display 1501, or any other input device.

The antenna 1505, which can be an external antenna or an internal antenna, is a directional or omni-directional antenna used for the transmission and reception of radiofrequency (RF) signals that implement point-to-point radio communication, wireless local area network (LAN) communication, or location determination. The antenna 1505 may facilitate point-to-point radio communication using the Specialized Mobile Radio (SMR), cellular, or Personal Communication Service (PCS) frequency bands, and may implement the transmission of data using any number or data standards. For example, the antenna 1505 may allow data to be transmitted between the device 1500 and a base station using technologies such as Wireless Broadband (WiBro), Worldwide Interoperability for Microwave ACCess (WiMAX), 10GPP Long Term Evolution (LTE), Ultra Mobile Broadband (UMB), High Performance Radio Metropolitan Network (HIPERMAN), iBurst or High Capacity Spatial Division Multiple Access (HC-SDMA), High Speed OFDM Packet Access (HSOPA), High-Speed Packet Access (HSPA), HSPA Evolution, HSPA+, High Speed Upload Packet Access (HSUPA), High Speed Downlink Packet Access (HSDPA), Generic Access Network (GAN), Time Division-Synchronous Code Division Multiple Access (TD-SCDMA), Evolution-Data Optimized (or Evolution-Data Only) (EVDO), Time Division-Code Division Multiple Access (TD-CDMA), Freedom Of Mobile Multimedia Access (FOMA), Universal Mobile Telecommunications System (UMTS), Wideband Code Division Multiple Access (W-CDMA), Enhanced Data rates for GSM Evolution (EDGE), Enhanced GPRS (EGPRS), Code Division Multiple Access-2000 (CDMA2000), Wideband Integrated Dispatch Enhanced Network (WiDEN), High-Speed Circuit-Switched Data (HSCSD), General Packet Radio Service (GPRS), Personal Handy-Phone System (PHS), Circuit Switched Data (CSD), Personal Digital Cellular (PDC), CDMAone, Digital Advanced Mobile Phone System (D-AMPS), Integrated Digital Enhanced Network (IDEN), Global System for Mobile communications (GSM), DataTAC, Mobitex, Cellular Digital Packet Data (CDPD), Hicap, Advanced Mobile Phone System (AMPS), Nordic Mobile Phone (NMP), Autoradiopuhelin (ARP), Autotel or Public Automated Land Mobile (PALM), Mobiltelefonisystem D (MTD), Offentlig Landmobil Telefoni (OLT), Advanced Mobile Telephone System (AMTS), Improved Mobile Telephone Service (IMTS), Mobile Telephone System (MTS), Push-To-Talk (PTT), or other technologies. Communication via W-CDMA, HSUPA, GSM, GPRS, and EDGE networks may occur, for example, using a QUALCOMM MSM7200A chipset with an QUALCOMM RTR6285™ transceiver and PM7540™ power management circuit.

The wireless or wired computer network connection 1506 may be a modem connection, a local-area network (LAN) connection including the Ethernet, or a broadband wide-area network (WAN) connection such as a digital subscriber line (DSL), cable high-speed internet connection, dial-up connection, T-1 line, T-10 line, fiber optic connection, or satellite connection. The network connection 1506 may connect to a LAN network, a corporate or government WAN network, the Internet, a telephone network, or other network. The network connection 1506 uses a wired or wireless connector. Example wireless connectors include, for example, an INFRARED DATA ASSOCIATION (IrDA) wireless connector, a Wi-Fi wireless connector, an optical wireless connector, an INSTITUTE OF ELECTRICAL AND ELECTRONICS ENGINEERS (IEEE) Standard 802.11 wireless connector, a BLUETOOTH wireless connector (such as a BLUETOOTH version 1.2 or 10.0 connector), a near field communications (NFC) connector, an orthogonal frequency division multiplexing (OFDM) ultra wide band (UWB) wireless connector, a time-modulated ultra wide band (TM-UWB) wireless connector, or other wireless connector. Example wired connectors include, for example, a IEEE-1394 FIREWIRE connector, a Universal Serial Bus (USB) connector (including a mini-B USB interface connector), a serial port connector, a parallel port connector, or other wired connector. In another implementation, the functions of the network connection 1506 and the antenna 1505 are integrated into a single component.

The camera 1507 allows the device 1500 to capture digital images, and may be a scanner, a digital still camera, a digital video camera, other digital input device. In one example implementation, the camera 1507 is a 10 mega-pixel (MP) camera that utilizes a complementary metal-oxide semiconductor (CMOS).

The microphone 1509 allows the device 1500 to capture sound, and may be an omni-directional microphone, a unidirectional microphone, a bi-directional microphone, a shotgun microphone, or other type of apparatus that converts sound to an electrical signal. The microphone 1509 may be used to capture sound generated by a user, for example when the user is speaking to another user during a telephone call via the device 1500. Conversely, the speaker 1510 allows the device to convert an electrical signal into sound, such as a voice from another user generated by a telephone application program, or a ring tone generated from a ring tone application program. Furthermore, although the device 1500 is illustrated in FIG. 10 as a handheld device, in further implementations the device 1500 may be a laptop, a workstation, a midrange computer, a mainframe, an embedded system, telephone, desktop PC, a tablet computer, a PDA, or other type of computing device.

Figure 16:
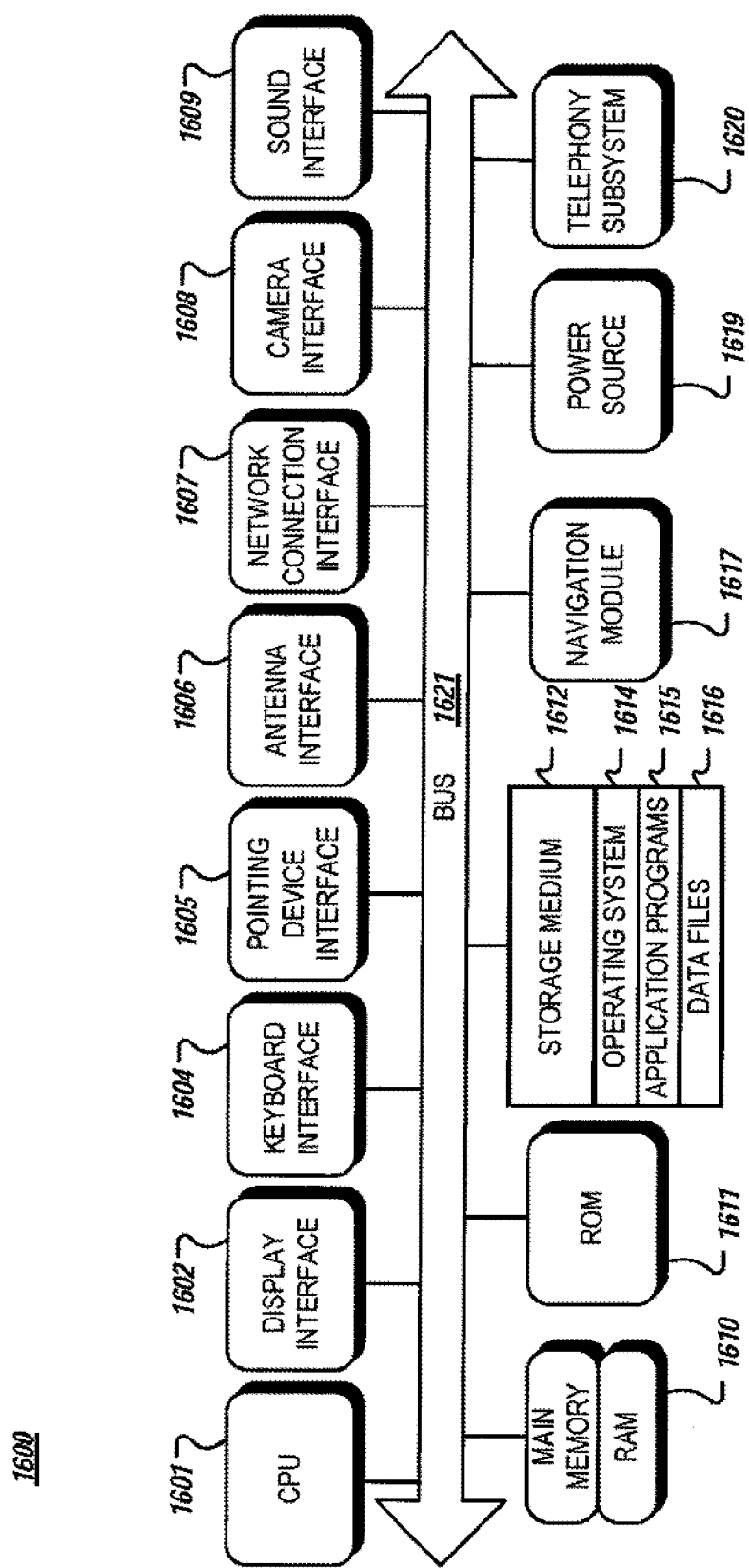
FIG. 16 is a block diagram illustrating the internal architecture of the device of FIG. 15.

FIG. 16 is a block diagram illustrating an internal architecture 1600 of the device 1500. The architecture includes a central processing unit (CPU) 1601 where the computer instructions that comprise an operating system or an application are processed; a display interface 1602 that provides a communication interface and processing functions for rendering video, graphics, images, and texts on the display 1501, provides a set of built-in controls (such as buttons, text and lists), and supports diverse screen sizes; a keyboard interface 1604 that provides a communication interface to the keyboard 1502; a pointing device interface 1605 that provides a communication interface to the pointing device 1504; an antenna interface 1606 that provides a communication interface to the antenna 1505; a network connection interface 1607 that provides a communication interface to a network over the computer network connection 1506; a camera interface 1608 that provides a communication interface and processing functions for capturing digital images from the camera 1507; a sound interface 1609 that provides a communication interface for converting sound into electrical signals using the microphone 1509 and for converting electrical signals into sound using the speaker 1510; a random access memory (RAM) 1610 where computer instructions and data are stored in a volatile memory device for processing by the CPU 1601; a read-only memory (ROM) 1611 where invariant low-level systems code or data for basic system functions such as basic input and output (I/O), startup, or reception of keystrokes from the keyboard 1502 are stored in a non-volatile memory device; a storage medium 1612 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files that comprise an operating system 1614, application programs 1615 (including, for example, a web browser application, a widget or gadget engine, and or other applications, as necessary) and data files 1616 are stored; a navigation module 1617 that provides a real-world or relative position or geographic location of the device 1500; a power source 1619 that provides an appropriate alternating current (AC) or direct current (DC) to power components; and a telephony subsystem 1620 that allows the device 1500 to transmit and receive sound over a telephone network. The constituent devices and the CPU 1601 communicate with each other over a bus 1621.

The CPU 1601 can be one of a number of computer processors. In one arrangement, the computer CPU 1601 is more than one processing unit. The RAM 1610 interfaces with the computer bus 1621 so as to provide quick RAM storage to the CPU 1601 during the execution of software programs such as the operating system application programs, and device drivers. More specifically, the CPU 1601 loads computer-executable process blocks from the storage medium 1612 or other media into a field of the RAM 1610 in order to execute software programs. Data is stored in the RAM 1610, where the data is accessed by the computer CPU 1601 during execution. In one example configuration, the device 1500 includes at least 128 MB of RAM, and 256 MB of flash memory.

The storage medium 1612 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow the device 1500 to access computer-executable process blocks, application programs and the like, stored on removable and non-removable memory media, to off-load data from the device 1500, or to upload data onto the device 1500.

A computer program product is tangibly embodied in storage medium 1612, a machine-readable storage medium. The computer program product includes instructions that, when read by a machine, operate to cause a data processing apparatus to store image data in the mobile device. In some embodiments, the computer program product includes instructions that perform multisensory speech detection.

The operating system 1614 may be a LINUX-based operating system such as the GOOGLE mobile device platform; APPLE MAC OS X; MICROSOFT WINDOWS NT/WINDOWS 2000/WINDOWS XP/WINDOWS MOBILE; a variety of UNIX-flavored operating systems; or a proprietary operating system for computers or embedded systems. The application development platform or framework for the operating system 1614 may be: BINARY RUNTIME ENVIRONMENT FOR WIRELESS (BREW); JAVA Platform, Micro Edition (JAVA ME) or JAVA 2 Platform, Micro Edition (J2ME) using the SUN MICROSYSTEMS JAVASCRIPT programming language; PYTHON™, FLASH LITE, or MICROSOFT.NET Compact, or another appropriate environment.

The device stores computer-executable code for the operating system 1614, and the application programs 1615 such as an email, instant messaging, a video service application, a mapping application, word processing, spreadsheet, presentation, gaming, mapping, web browsing, JAVASCRIPT engine, or other applications. For example, one implementation may allow a user to access the GOOGLE GMAIL email application, the GOOGLE TALK instant messaging application, a YOUTUBE video service application, a GOOGLE MAPS or GOOGLE EARTH mapping application, or a GOOGLE PICASA imaging editing and presentation application. The application programs 1615 may also include a widget or gadget engine, such as a TAFRI™ widget engine, a MICROSOFT gadget engine such as the WINDOWS SIDEBAR gadget engine or the KAPSULES™ gadget engine, a YAHOO! widget engine such as the KONFABULTOR™ widget engine, the APPLE DASHBOARD widget engine, the GOOGLE gadget engine, the KLIPFOLIO widget engine, an OPERA™ widget engine, the WIDSETS™ widget engine, a proprietary widget or gadget engine, or other widget or gadget engine that provides host system software for a physically-inspired applet on a desktop.

Although it is possible to provide for multisensory speech detection using the above-described implementation, it is also possible to implement the functions according to the present disclosure as a dynamic link library (DLL), or as a plug-in to other application programs such as an Internet web-browser such as the FOXFIRE web browser, the APPLE SAFARI web browser or the MICROSOFT INTERNET EXPLORER web browser.

The navigation module 1617 may determine an absolute or relative position of the device, such as by using the Global Positioning System (GPS) signals, the GLObal NAvigation Satellite System (GLONASS), the Galileo positioning system, the Beidou Satellite Navigation and Positioning System, an inertial navigation system, a dead reckoning system, or by accessing address, internet protocol (IP) address, or location information in a database. The navigation module 1617 may also be used to measure angular displacement, orientation, or velocity of the device 1500, such as by using one or more accelerometers.

Figure 17:
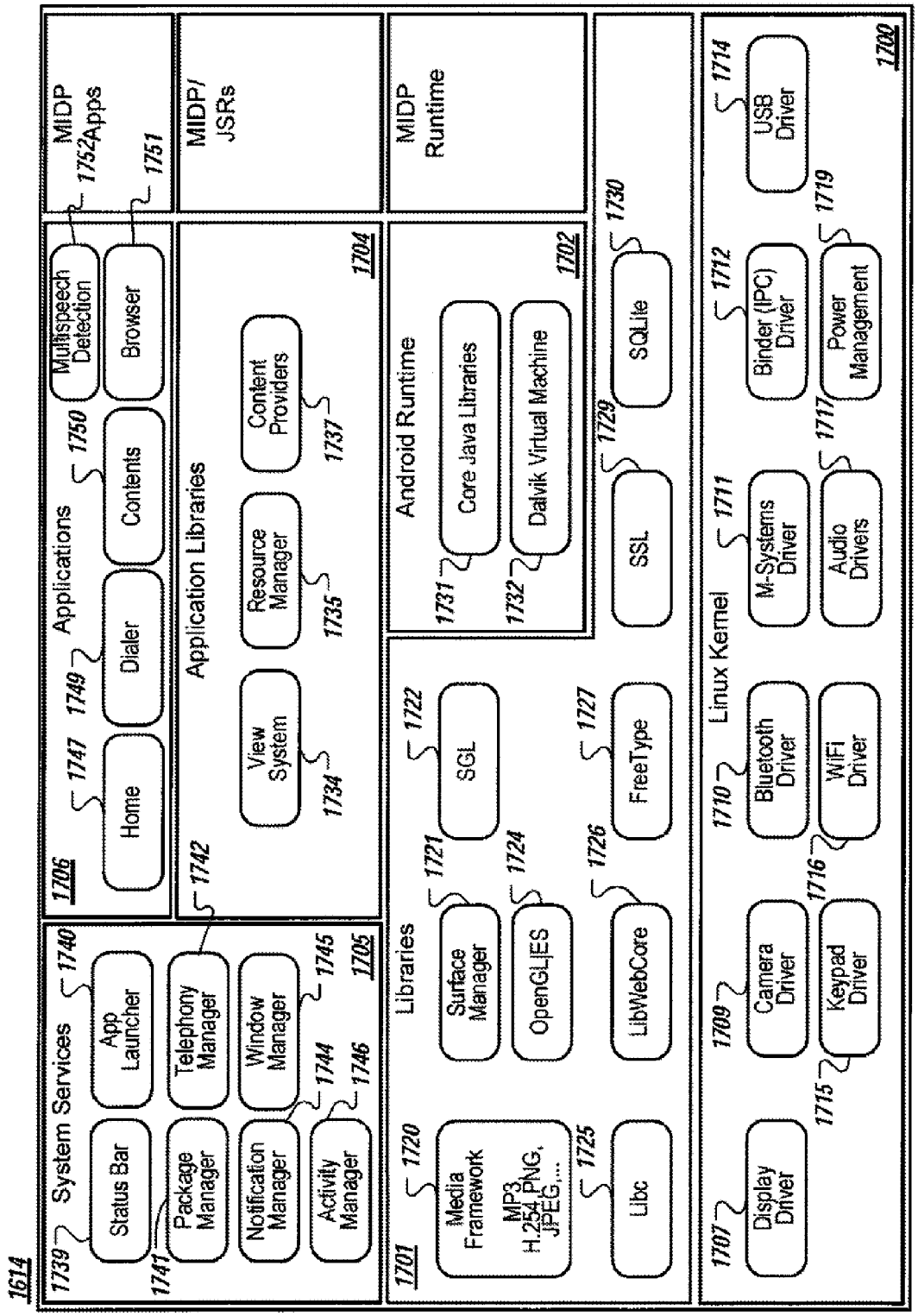
FIG. 17 is a block diagram illustrating exemplary components of the operating system used by the device of FIG. 15.

FIG. 17 is a block diagram illustrating exemplary components of the operating system 1614 used by the device 1500, in the case where the operating system 1614 is the GOOGLE mobile device platform. The operating system 1614 invokes multiple processes, while ensuring that the associated phone application is responsive, and that wayward applications do not cause a fault (or "crash") of the operating system. Using task switching, the operating system 1614 allows for the switching of applications while on a telephone call, without losing the state of each associated application. The operating system 1614 may use an application framework to encourage reuse of components, and provide a scalable user experience by combining pointing device and keyboard inputs and by allowing for pivoting. Thus, the operating system 1614 can provide a rich graphics system and media experience, while using an advanced, standards-based web browser.

The operating system 1614 can generally be organized into six components: a kernel 1700, libraries 1701, an operating system runtime 1702, application libraries 1704, system services 1705, and applications 1706. The kernel 1700 includes a display driver 1707 that allows software such as the operating system 1614 and the application programs 1715 to interact with the display 1501 via the display interface 1602, a camera driver 1709 that allows the software to interact with the camera 1507; a BLUETOOTH driver 1710; a M-Systems driver 1711; a binder (IPC) driver 1712, a USB driver 1714 a keypad driver 1715 that allows the software to interact with the keyboard 1502 via the keyboard interface 1604; a WiFi driver 1716; audio drivers 1717 that allow the software to interact with the microphone 1509 and the speaker 1510 via the sound interface 1609; and a power management component 1719 that allows the software to interact with and manage the power source 1619.

The BLUETOOTH driver, which in one implementation is based on the BlueZ BLUETOOTH stack for LINUX-based operating systems, provides profile support for headsets and hands-free devices, dial-up networking, personal area networking (PAN), or audio streaming (such as by Advance Audio Distribution Profile (A2DP) or Audio/Video Remote Control Profile (AVRCP). The BLUETOOTH driver provides JAVA bindings for scanning, pairing and unpairing, and service queries.

The libraries 1701 include a media framework 1720 that supports standard video, audio and still-frame formats (such as Moving Picture Experts Group (MPEG)-11, H.264, MPEG-1 Audio Layer-10 (MP3), Advanced Audio Coding (AAC), Adaptive Multi-Rate (AMR), Joint Photographic Experts Group (JPEG), and others) using an efficient JAVA Application Programming Interface (API) layer; a surface manager 1721; a simple graphics library (SGL) 1722 for two-dimensional application drawing; an Open Graphics Library for Embedded Systems (OpenGL ES) 1724 for gaming and three-dimensional rendering; a C standard library (LIBC) 1725; a LIBWEBCORE library 1726; a FreeType library 1727; an SSL 1729; and an SQLite library 1730.

The operating system runtime 1702 includes core JAVA libraries 1731, and a Dalvik virtual machine 1732. The Dalvik virtual machine 1732 is a custom, virtual machine that runs a customized file format (.DEX).

The operating system 1614 can also include Mobile Information Device Profile (MIDP) components such as the MIDP JAVA Specification Requests (JSRs) components, MIDP runtime, and MIDP applications as shown in FIG. 17. The MIDP components can support MIDP applications running on the device 1500.

With regard to graphics rendering, a system-wide composer manages surfaces and a frame buffer and handles window transitions, using the OpenGL ES 1724 and two-dimensional hardware accelerators for its compositions.

The Dalvik virtual machine 1732 may be used with an embedded environment, since it uses runtime memory very efficiently, implements a CPU-optimized bytecode interpreter, and supports multiple virtual machine processes per device. The custom file format (.DEX) is designed for runtime efficiency, using a shared constant pool to reduce memory, read-only structures to improve cross-process sharing, concise, and fixed-width instructions to reduce parse time, thereby allowing installed applications to be translated into the custom file formal at build-time. The associated bytecodes are designed for quick interpretation, since register-based instead of stack-based instructions reduce memory and dispatch overhead, since using fixed width instructions simplifies parsing, and since the 16-bit code units minimize reads.

The application libraries 1704 include a view system 1734, a resource manager 1735, and content providers 1737. The system services 1705 includes a status bar 1739; an application launcher 1740; a package manager 1741 that maintains information for all installed applications; a telephony manager 1742 that provides an application level JAVA interface to the telephony subsystem 1620; a notification manager 1744 that allows all applications access to the status bar and on-screen notifications; a window manager 1745 that allows multiple applications with multiple windows to share the display 1501; and an activity manager 1746 that runs each application in a separate process, manages an application life cycle, and maintains a cross-application history.

The applications 1706 include a home application 1747, a dialer application 1749, a contacts application 1750, a browser application 1751, and a multispeech detection application 1752.

The telephony manager 1742 provides event notifications (such as phone state, network state, Subscriber Identity Module (SIM) status, or voicemail status), allows access to state information (such as network information, SIM information, or voicemail presence), initiates calls, and queries and controls the call state. The browser application 1751 renders web pages in a full, desktop-like manager, including navigation functions. Furthermore, the browser application 1751 allows single column, small screen rendering, and provides for the embedding of HTML views into other applications.

Figure 18:
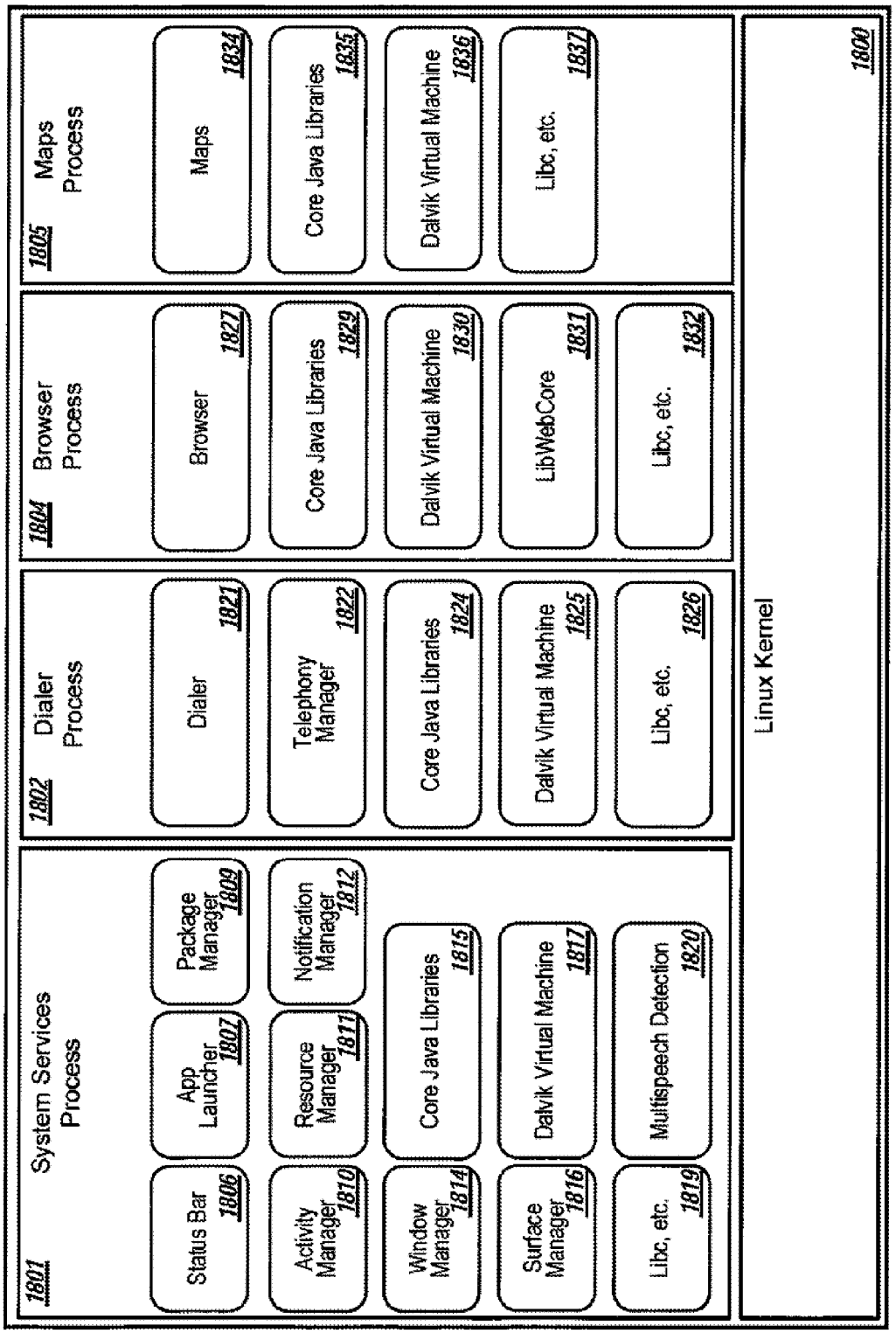
FIG. 18 is a block diagram illustrating exemplary processes implemented by the operating system kernel of FIG. 17.

FIG. 18 is a block diagram illustrating exemplary processes implemented by the operating system kernel 1800. Generally, applications and system services run in separate processes, where the activity manager 1746 runs each application in a separate process and manages the application life cycle. The applications run in their own processes, although many activities or services can also run in the same process. Processes are started and stopped as needed to run an application's components, and processes may be terminated to reclaim resources. Each application is assigned its own process, whose name is the application's package name, and individual parts of an application can be assigned another process name.

Some processes can be persistent. For example, processes associated with core system components such as the surface manager 1816, the window manager 1814, or the activity manager 1810 can be continuously executed while the device 1500 is powered. Additionally, some application-specific process can also be persistent. For example, processes associated with the dialer application 1821, may also be persistent.

The processes implemented by the operating system kernel 1800 may generally be categorized as system services processes 1801, dialer processes 1802, browser processes 1804, and maps processes 1805. The system services processes 1801 include status bar processes 1806 associated with the status bar 1739; application launcher processes 1807 associated with the application launcher 1740; package manager processes 1809 associated with the package manager 1741; activity manager processes 1810 associated with the activity manager 1746; resource manager processes 1811 associated with a resource manager 1735 that provides access to graphics, localized strings, and XML layout descriptions; notification manger processes 1812 associated with the notification manager 1744; window manager processes 1814 associated with the window manager 1845; core JAVA libraries processes 1815 associated with the core JAVA libraries 1731; surface manager processes 1816 associated with the surface manager 1721; Dalvik virtual machine processes 1817 associated with the Dalvik virtual machine 1732, LIBC processes 1819 associated with the LIBC library 1725; and multispeech detection processes 1820 associated with the multispeech detection application 1752.

The dialer processes 1802 include dialer application processes 1821 associated with the dialer application 1749; telephony manager processes 1822 associated with the telephony manager 1742; core JAVA libraries processes 1824 associated with the core JAVA libraries 1731; Dalvik virtual machine processes 1825 associated with the Dalvik Virtual machine 1732; and LIBC processes 1826 associated with the LIBC library 1725. The browser processes 1804 include browser application processes 1827 associated with the browser application 1751; core JAVA libraries processes 1829 associated with the core JAVA libraries 1731; Dalvik virtual machine processes 1830 associated with the Dalvik virtual machine 1732; LIBWEBCORE processes 1831 associated with the LIBWEBCORE library 1726; and LIBC processes 1832 associated with the LIBC library 1725.

The maps processes 1805 include maps application processes 1834, core JAVA libraries processes 1835, Dalvik virtual machine processes 1836, and LIBC processes 1837. Notably, some processes, such as the Dalvik virtual machine processes, may exist within one or more of the systems services processes 1801, the dialer processes 1802, the browser processes 1804, and the maps processes 1805.

Figure 19:
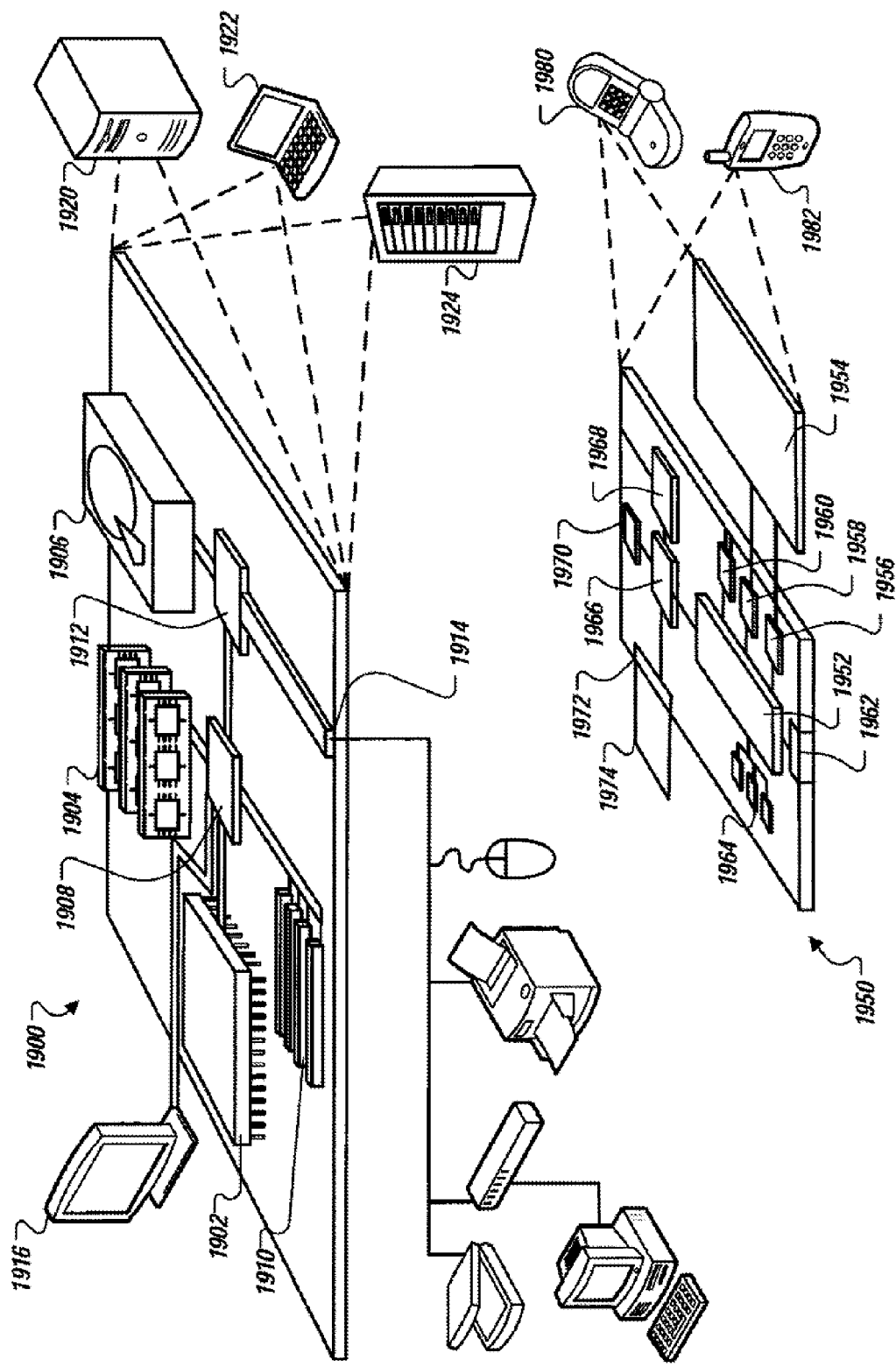
FIG. 19 shows an example of a computer device and a mobile computer device that can be used to implement the techniques described here.

FIG. 19 shows an example of a generic computer device 1900 and a generic mobile computer device 1950, which may be used with the techniques described here. Computing device 1900 is intended to represent various forms of digital computers, such as laptops, desktops, workstations, personal digital assistants, servers, blade servers, mainframes, and other appropriate computers. Computing device 1950 is intended to represent various forms of mobile devices, such as personal digital assistants, cellular telephones, smartphones, and other similar computing devices. The components shown here, their connections and relationships, and their functions, are meant to be exemplary only, and are not meant to limit the implementations described and/or claimed in this document.

Computing device 1900 includes a processor 1902, memory 1904, a storage device 1906, a high-speed interface 1908 connecting to memory 1904 and high-speed expansion ports 1910, and a low speed interface 1912 connecting to low speed bus 1914 and storage device 1906. Each of the components 1902, 1904, 1906, 1908, 1910, and 1912, are interconnected using various busses, and may be mounted on a common motherboard or in other manners as appropriate. The processor 1902 can process instructions for execution within the computing device 1900, including instructions stored in the memory 1904 or on the storage device 1906 to display graphical information for a GUI on an external input/output device, such as display 1916 coupled to high speed interface 1908. In other implementations, multiple processors and/or multiple buses may be used, as appropriate, along with multiple memories and types of memory. Also, multiple computing devices 1900 may be connected, with each device providing portions of the necessary operations (e.g., as a server bank, a group of blade servers, or a multi-processor system).

The memory 1904 stores information within the computing device 1900. In one implementation, the memory 1904 is a volatile memory unit or units. In another implementation, the memory 1904 is a non-volatile memory unit or units. The memory 1904 may also be another form of computer-readable medium, such as a magnetic or optical disk.

The storage device 1906 is capable of providing mass storage for the computing device 1900. In one implementation, the storage device 1906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1904, the storage device 1906, memory on processor 1902, or a propagated signal.

The high speed controller 1908 manages bandwidth-intensive operations for the computing device 1900, while the low speed controller 1912 manages lower bandwidth-intensive operations. Such allocation of functions is exemplary only. In one implementation, the high-speed controller 1908 is coupled to memory 1904, display 1916 (e.g., through a graphics processor or accelerator), and to high-speed expansion ports 1910, which may accept various expansion cards (not shown). In the implementation, low-speed controller 1912 is coupled to storage device 1906 and low-speed expansion port 1914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1900 may be implemented in a number of different forms, as shown in the figure. For example, it may be implemented as a standard server 1920, or multiple times in a group of such servers. It may also be implemented as part of a rack server system 1924. In addition, it may be implemented in a personal computer such as a laptop computer 1922. Alternatively, components from computing device 1900 may be combined with other components in a mobile device (not shown), such as device 1950. Each of such devices may contain one or more of computing device 1900, 1950, and an entire system may be made up of multiple computing devices 1900, 1950 communicating with each other.

Computing device 1950 includes a processor 1952, memory 1964, an input/output device such as a display 1954, a communication interface 1966, and a transceiver 1968, among other components. The device 1950 may also be provided with a storage device, such as a microdrive or other device, to provide additional storage. Each of the components 1950, 1952, 1964, 1954, 1966, and 1968, are interconnected using various buses, and several of the components may be mounted on a common motherboard or in other manners as appropriate.

The processor 1952 can execute instructions within the computing device 1950, including instructions stored in the memory 1964. The processor may be implemented as a chipset of chips that include separate and multiple analog and digital processors. The processor may provide, for example, for coordination of the other components of the device 1950, such as control of user interfaces, applications run by device 1950, and wireless communication by device 1950.

Processor 1952 may communicate with a user through control interface 1958 and display interface 1956 coupled to a display 1954. The display 1954 may be, for example, a TFT LCD (Thin-Film-Transistor Liquid Crystal Display) or an OLED (Organic Light Emitting Diode) display, or other appropriate display technology. The display interface 1956 may comprise appropriate circuitry for driving the display 1954 to present graphical and other information to a user. The control interface 1958 may receive commands from a user and convert them for submission to the processor 1952. In addition, an external interface 1962 may be provide in communication with processor 1952, so as to enable near area communication of device 1950 with other devices. External interface 1962 may provide, for example, for wired communication in some implementations, or for wireless communication in other implementations, and multiple interfaces may also be used.

The memory 1964 stores information within the computing device 1950. The memory 1964 can be implemented as one or more of a computer-readable medium or media, a volatile memory unit or units, or a non-volatile memory unit or units. Expansion memory 1974 may also be provided and connected to device 1950 through expansion interface 1972, which may include, for example, a SIMM (Single In Line Memory Module) card interface. Such expansion memory 1974 may provide extra storage space for device 1950, or may also store applications or other information for device 1950. Specifically, expansion memory 1974 may include instructions to carry out or supplement the processes described above, and may include secure information also. Thus, for example, expansion memory 1974 may be provide as a security module for device 1950, and may be programmed with instructions that permit secure use of device 1950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1964, expansion memory 1974, memory on processor 1952, or a propagated signal that may be received, for example, over transceiver 1968 or external interface 1962.

Device 1950 may communicate wirelessly through communication interface 1966, which may include digital signal processing circuitry where necessary. Communication interface 1966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1968. In addition, short-range communication may occur, such as using a Bluetooth, WiFi, or other such transceiver (not shown). In addition, GPS (Global Positioning System) receiver module 1970 may provide additional navigation- and location-related wireless data to device 1950, which may be used as appropriate by applications running on device 1950.

Device 1950 may also communicate audibly using audio codec 1960, which may receive spoken information from a user and convert it to usable digital information. Audio codec 1960 may likewise generate audible sound for a user, such as through a speaker, e.g., in a handset of device 1950. Such sound may include sound from voice telephone calls, may include recorded sound (e.g., voice messages, music files, etc.) and may also include sound generated by applications operating on device 1950.

The computing device 1950 may be implemented in a number of different forms, as shown in the figure. For example, it may be implemented as a cellular telephone 1980. It may also be implemented as part of a smartphone 1982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In addition, the logic flows depicted in the figures do not require the particular order shown, or sequential order, to achieve desirable results. In addition, other blocks may be provided, or blocks may be eliminated, from the described flows, and other components may be added to, or removed from, the described systems. Accordingly, other implementations are within the scope of the following claims.

What is claimed is:

1. A computer-implemented method, comprising:
receiving, by a processor included in a mobile device, accelerometer values for a period of time during which the mobile device completes a gesture;
partitioning the accelerometer values into a plurality of distinct segments;
detecting a movement of the mobile device based on detecting a set of acceleration values of the mobile device;
identifying that the mobile device completed the gesture based on applying the movement of the mobile device to a first Bayesian network and a second Bayesian network, wherein:
the first Bayesian network includes a first plurality of states, wherein each respective state in the first plurality of states corresponds to a respective one of the plurality of distinct segments, and wherein the first Bayesian network corresponds to the gesture being performed at a first speed, and
the second Bayesian network includes a second plurality of states, wherein each respective state in the second plurality of states corresponds to a respective one of the plurality of distinct segments, and wherein the second Bayesian network corresponds to the gesture being performed at a second speed that is slower than the first speed; and
taking an action in response to identifying that the mobile device completed the gesture.

2. The computer-implemented method of claim 1, wherein the one or more of the first and second Bayesian networks comprises a Hidden Markov Model.

3. The computer-implemented method of claim 1, wherein the action taken in response to identifying that the mobile device completed the gesture comprises recording speech from the person.

4. The computer-implemented method of claim 1, wherein the action taken in response to identifying that the mobile device completed the gesture comprises ceasing recording speech from the person.

5. The computer-implemented method of claim 1, wherein the action taken in response to identifying that the mobile device completed the gesture comprises providing feedback to a person, the feedback comprising at least one of auditory feedback, tactile feedback, and visual feedback.

6. The computer-implemented method of claim 5, wherein the feedback indicates that speech recording is commencing.

7. The computer-implemented method of claim 5, wherein the feedback indicates that speech recording is ceasing.

8. The computer-implemented method of claim 1, wherein the set of acceleration values uses a spherical polar coordinate system.

9. The computer-implemented method of claim 1, wherein each state of the first and second Bayesian networks is associated with at least one observation for the gesture associated with the Bayesian network, the at least one observation comprising at least one of an endpointer state, a proximity vector, and an audio vector.

10. The computer-implemented method of claim 1, further comprising training the first and second Bayesian networks based on real movement trajectories during multiple iterations of the gesture.

11. The computer-implemented method of claim 10, wherein the training the first and second Bayesian networks comprises aligning accelerometer timeseries data for each real movement trajectory.

12. The computer-implemented method of claim 11, wherein the step of aligning the accelerometer timeseries data for each real movement trajectory comprises trimming at least one of the accelerometer timeseries.

13. The computer-implemented method of claim 1, wherein detecting the movement of the mobile device is further based on camera data corresponding to motion of lips of a user of the mobile device.

14. The computer-implemented method of claim 1, wherein detecting the movement of the mobile device is further based on detecting a set of positional angles of the mobile device, and receiving proximity data from a proximity sensor included in the mobile device.

15. A non-transitory computer-readable medium having computer-readable program code embodied therein that when executed by a processor, cause a computer system to perform the steps of:
receiving accelerometer values for a period of time during which a mobile device completes a gesture;
partitioning the accelerometer values into a plurality of distinct segments;
detecting a movement of the mobile device based on detecting a set of acceleration values of the mobile device;
identifying that the mobile device completed the gesture based on applying the movement of the mobile device to a first Bayesian network and a second Bayesian network, wherein:
the first Bayesian network includes a first plurality of states, wherein each respective state in the first plurality of states corresponds to a respective one of the plurality of distinct segments, and wherein the first Bayesian network corresponds to the gesture being performed at a first speed, and
the second Bayesian network includes a second plurality of states, wherein each respective state in the second plurality of states corresponds to a respective one of the plurality of distinct segments, and wherein the second Bayesian network corresponds to the gesture being performed at a second speed that is slower than the first speed; and taking an action in to identifying that the mobile device completed the gesture.

16. The computer-readable medium of claim 15, wherein the one or more of the first and second Bayesian networks comprises a Hidden Markov Model.

17. The computer-readable medium of claim 15, wherein the action taken in response to identifying that the mobile device completed the gesture comprises recording speech from the person.

18. The computer-readable medium of claim 15, wherein the action taken in response to identifying that the mobile device completed the gesture comprises ceasing recording speech from the person.

19. The computer-readable medium of claim 15, wherein the action taken in response to identifying that the mobile device completed the gesture comprises providing feedback to a person, the feedback comprising at least one of auditory feedback, tactile feedback, and visual feedback.

20. The computer-readable medium of claim 19, wherein the feedback indicates that speech recording is commencing.

21. The computer-readable medium of claim 19, wherein the feedback indicates that speech recording is ceasing.

22. The computer-readable medium of claim 15, wherein the set of acceleration values uses a spherical polar coordinate system.

23. The computer-readable medium of claim 15, wherein each state of the first and second Bayesian networks is associated with at least one observation for the gesture associated with the Bayesian network, the at least one observation comprising at least one of an endpointer state, a proximity vector, and an audio vector.

24. The computer-readable medium of claim 15, further comprising training the first and second Bayesian networks based on real movement trajectories during multiple iterations of the gesture.

25. The computer-readable medium of claim 24, wherein the training the first and second Bayesian networks comprises aligning accelerometer timeseries data for each real movement trajectory.

26. The computer-readable medium of claim 25, wherein the step of aligning the accelerometer timeseries data for each real movement trajectory comprises trimming at least one of the accelerometer timeseries.

27. The computer-readable medium of claim 15, wherein detecting the movement of the mobile device is further based on camera data corresponding to motion of lips of a user of the mobile device.

28. The computer-readable medium of claim 15, wherein detecting the movement of the mobile device is further based on detecting a set of positional angles of the mobile device, and receiving proximity data from a proximity sensor included in the mobile device.

* * * * *

UNITED STATES PATENT AND TRADEMARK OFFICE
CERTIFICATE OF CORRECTION

PATENT NO. : 8,922,485 B1  Page 1 of 1
APPLICATION NO. : 12/972206
DATED : December 30, 2014
INVENTOR(S) : Matthew Lloyd It is certified that error appears in the above-identified patent and that said Letters Patent is hereby corrected as shown below:

*In the Claims*

*Claim 15, column 34, lines 45-46*

"therein that when executed by a processor,"

should read

"therein that, when executed by a processor,"

Signed and Sealed this
Fourteenth Day of April, 2015

Michelle K. Lee
*Director of the United States Patent and Trademark Office*